United States Patent
Feng et al.

(10) Patent No.: US 9,576,271 B2
(45) Date of Patent: *Feb. 21, 2017

(54) SYSTEM AND METHOD FOR COMMUNITY CENTRIC RESOURCE SHARING BASED ON A PUBLISHING SUBSCRIPTION MODEL

(75) Inventors: Andrew Feng, Cupertino, CA (US); Atul Bhandari, Sunnyvale, CA (US); Valerie Kucharewski, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 13/598,379

(22) Filed: Aug. 29, 2012

(65) Prior Publication Data

US 2012/0324364 A1    Dec. 20, 2012

Related U.S. Application Data

(63) Continuation of application No. 12/784,737, filed on May 21, 2010, which is a continuation of application
(Continued)

(51) Int. Cl.
*G06F 3/048* (2013.01)
*G06Q 10/10* (2012.01)
(Continued)

(52) U.S. Cl.
CPC ............ *G06Q 10/10* (2013.01); *G06F 3/048* (2013.01); *G06F 3/0484* (2013.01); *G06F 15/16* (2013.01)

(58) Field of Classification Search
CPC ......... G06F 3/048; G06F 3/0484; G06F 15/16
(Continued)

(56) References Cited

U.S. PATENT DOCUMENTS

| 4,206,315 A | 6/1980 | Matyas et al. |
|---|---|---|
| 4,425,665 A | 1/1984 | Stauffer |

(Continued)

FOREIGN PATENT DOCUMENTS

| EP | 0276424 | 8/1988 |
|---|---|---|
| EP | 0276425 A2 | 8/1988 |

(Continued)

OTHER PUBLICATIONS

US 5,749,074, 05/1998, Kasso et al. (withdrawn)
(Continued)

*Primary Examiner* — Tuyetlien T Tran
(74) *Attorney, Agent, or Firm* — Morgan, Lewis & Bockius LLP

(57) ABSTRACT

The invention provides a Web service which enables a publisher to share his digital resources such as an address card or a calendar with a number of subscribers based on different sharing relationships. The Web service includes a host-based interface called "My Community", for example, with which the publisher manages the share-relationships with his community members. The community members are organized into different groups. Each group includes a number of community members who have a common sharing relationship with the publisher with respect to one or more views of the shared resources. A resource may have multiple views. Each of the views has Metadata describing sharing-styles, as well as version, creation date, size, and the like. Each sharing style corresponds to a specific sharing relationship between a community member and the publisher.

19 Claims, 30 Drawing Sheets

Related U.S. Application Data

No. 10/606,021, filed on Jun. 24, 2003, now Pat. No. 7,739,602.

(51) Int. Cl.
  *G06F 3/0484* (2013.01)
  *G06F 15/16* (2006.01)

(58) Field of Classification Search
  USPC .......................................................... 715/733
  See application file for complete search history.

(56) References Cited

U.S. PATENT DOCUMENTS

| | | |
|---|---|---|
| 4,638,356 A | 1/1987 | Frezza |
| 4,807,154 A | 2/1989 | Scully et al. |
| 4,807,155 A | 2/1989 | Cree et al. |
| 4,817,018 A | 3/1989 | Cree et al. |
| 4,819,191 A | 4/1989 | Scully et al. |
| 4,831,552 A | 5/1989 | Scully et al. |
| 4,866,611 A | 9/1989 | Cree et al. |
| 4,977,520 A | 12/1990 | McGaughey, III et al. |
| 5,023,851 A | 6/1991 | Murray et al. |
| 5,124,912 A | 6/1992 | Hotaling et al. |
| 5,129,057 A | 7/1992 | Strope et al. |
| 5,202,890 A | 4/1993 | Iketani et al. |
| 5,204,961 A | 4/1993 | Barlow |
| 5,261,045 A | 11/1993 | Scully et al. |
| 5,327,486 A | 7/1994 | Wolff et al. |
| 5,329,578 A | 7/1994 | Brennan et al. |
| 5,457,476 A | 10/1995 | Jenson |
| 5,467,388 A | 11/1995 | Redd, Jr. et al. |
| 5,487,100 A | 1/1996 | Kane |
| 5,533,110 A | 7/1996 | Pinard et al. |
| 5,539,828 A | 7/1996 | Davis |
| 5,557,659 A | 9/1996 | Hyde-Thomson |
| 5,572,246 A | 11/1996 | Ellis et al. |
| 5,572,667 A | 11/1996 | Ideta |
| 5,583,920 A | 12/1996 | Wheeler, Jr. |
| 5,627,764 A | 5/1997 | Schutzman et al. |
| 5,694,616 A | 12/1997 | Johnson et al. |
| 5,721,779 A | 2/1998 | Funk |
| 5,734,709 A | 3/1998 | De Witt et al. |
| 5,793,365 A | 8/1998 | Tang et al. |
| 5,796,840 A | 8/1998 | Davis |
| 5,832,227 A | 11/1998 | Anderson et al. |
| 5,835,087 A | 11/1998 | Herz et al. |
| 5,872,917 A | 2/1999 | Hellman |
| 5,878,219 A | 3/1999 | Vance, Jr. et al. |
| 5,884,033 A | 3/1999 | Duvall et al. |
| 5,930,479 A | 7/1999 | Hall |
| 5,937,160 A | 8/1999 | Davis et al. |
| 5,944,786 A | 8/1999 | Quinn |
| 5,948,040 A | 9/1999 | DeLorme et al. |
| 5,960,406 A | 9/1999 | Rasansky et al. |
| 5,960,411 A | 9/1999 | Hartman et al. |
| 5,978,791 A | 11/1999 | Farber et al. |
| 5,987,508 A | 11/1999 | Agraharam et al. |
| 5,987,606 A | 11/1999 | Cirasole et al. |
| 5,999,600 A | 12/1999 | Shin |
| 5,999,932 A | 12/1999 | Paul |
| 6,006,228 A | 12/1999 | McCollum et al. |
| 6,012,051 A | 1/2000 | Sammon, Jr. et al. |
| 6,014,638 A | 1/2000 | Burge et al. |
| 6,018,343 A | 1/2000 | Wang et al. |
| 6,018,774 A | 1/2000 | Mayle et al. |
| 6,026,403 A | 2/2000 | Siefert |
| 6,047,260 A | 4/2000 | Levinson |
| 6,052,709 A | 4/2000 | Paul |
| 6,055,510 A | 4/2000 | Henrick et al. |
| 6,058,428 A | 5/2000 | Wang et al. |
| 6,073,142 A | 6/2000 | Geiger et al. |
| 6,076,111 A | 6/2000 | Chiu et al. |
| 6,085,249 A | 7/2000 | Wang et al. |
| 6,092,067 A | 7/2000 | Girling et al. |
| 6,097,389 A | 8/2000 | Morris et al. |
| 6,104,990 A | 8/2000 | Chaney et al. |
| 6,107,990 A | 8/2000 | Fleming |
| 6,111,572 A | 8/2000 | Blair et al. |
| 6,112,227 A | 8/2000 | Heiner |
| 6,141,686 A | 10/2000 | Jackowski et al. |
| 6,144,934 A | 11/2000 | Stockwell et al. |
| 6,151,584 A | 11/2000 | Papierniak et al. |
| 6,161,130 A | 12/2000 | Horvitz et al. |
| 6,161,630 A | 12/2000 | Stump et al. |
| 6,167,434 A | 12/2000 | Pang |
| 6,195,354 B1 | 2/2001 | Skalecki et al. |
| 6,195,698 B1 | 2/2001 | Lillibridge et al. |
| 6,199,102 B1 | 3/2001 | Cobb |
| 6,199,103 B1 | 3/2001 | Sakaguchi et al. |
| 6,202,061 B1 | 3/2001 | Khosla et al. |
| 6,216,110 B1 | 4/2001 | Silverberg |
| 6,249,805 B1 | 6/2001 | Fleming, III |
| 6,266,692 B1 | 7/2001 | Greenstein |
| 6,266,814 B1 | 7/2001 | Lemmons et al. |
| 6,269,369 B1 | 7/2001 | Robertson |
| 6,275,810 B1 | 8/2001 | Hetherington et al. |
| 6,278,456 B1 | 8/2001 | Wang et al. |
| 6,301,608 B1 | 10/2001 | Rochkind |
| 6,310,946 B1 | 10/2001 | Bauer et al. |
| 6,321,267 B1 | 11/2001 | Donaldson |
| 6,330,590 B1 | 12/2001 | Cotten |
| 6,336,117 B1 | 1/2002 | Massarani |
| 6,341,349 B1 | 1/2002 | Takaragi et al. |
| 6,345,260 B1 | 2/2002 | Cummings, Jr. et al. |
| 6,353,848 B1 | 3/2002 | Morris |
| 6,356,937 B1 | 3/2002 | Montville et al. |
| 6,366,661 B1 | 4/2002 | Devillier et al. |
| 6,393,464 B1 | 5/2002 | Dieterman |
| 6,393,465 B2 | 5/2002 | Leeds |
| 6,405,319 B1 | 6/2002 | Arnold et al. |
| 6,421,709 B1 | 7/2002 | McCormick et al. |
| 6,438,597 B1 | 8/2002 | Mosberger et al. |
| 6,453,327 B1 | 9/2002 | Nielsen |
| 6,460,044 B1 | 10/2002 | Wang |
| 6,466,918 B1 | 10/2002 | Spiegel et al. |
| 6,477,544 B1 | 11/2002 | Bolosky et al. |
| 6,493,107 B1 | 12/2002 | Toyoda et al. |
| 6,507,866 B1 | 1/2003 | Barchi |
| 6,519,703 B1 | 2/2003 | Joyce |
| 6,523,115 B1 | 2/2003 | Ono et al. |
| 6,542,943 B2 | 4/2003 | Cheng et al. |
| 6,546,416 B1 | 4/2003 | Kirsch |
| 6,549,416 B2 | 4/2003 | Sterner et al. |
| 6,584,564 B2 | 6/2003 | Olkin et al. |
| 6,599,139 B1 | 7/2003 | Hunter |
| 6,600,750 B1 | 7/2003 | Joffe et al. |
| 6,633,311 B1 * | 10/2003 | Douvikas et al. ............ 715/731 |
| 6,640,301 B1 | 10/2003 | Ng |
| 6,650,890 B1 | 11/2003 | Irlam et al. |
| 6,654,787 B1 | 11/2003 | Aronson et al. |
| 6,660,590 B2 | 12/2003 | Yoo |
| 6,671,357 B1 | 12/2003 | Roberts, Jr. |
| 6,691,156 B1 | 2/2004 | Drummond et al. |
| 6,701,440 B1 | 3/2004 | Kim et al. |
| 6,704,729 B1 | 3/2004 | Klein et al. |
| 6,714,967 B1 | 3/2004 | Horvitz |
| 6,714,982 B1 | 3/2004 | McDonough et al. |
| 6,725,381 B1 | 4/2004 | Smith et al. |
| 6,728,785 B1 | 4/2004 | Jungck |
| 6,732,149 B1 | 5/2004 | Kephart |
| 6,745,936 B1 | 6/2004 | Movalli et al. |
| 6,751,626 B2 | 6/2004 | Brown et al. |
| 6,760,752 B1 | 7/2004 | Liu et al. |
| 6,763,462 B1 | 7/2004 | Marsh |
| 6,766,352 B1 | 7/2004 | McBrearty et al. |
| 6,772,196 B1 | 8/2004 | Kirsch et al. |
| 6,785,679 B1 | 8/2004 | Dane et al. |
| 6,799,352 B2 | 10/2004 | Gilchrist et al. |
| 6,820,204 B1 | 11/2004 | Desai et al. |
| 6,829,635 B1 | 12/2004 | Townshend |
| 6,845,374 B1 | 1/2005 | Oliver et al. |
| 6,901,398 B1 | 5/2005 | Horvitz et al. |
| 6,978,419 B1 | 12/2005 | Kantrowitz |

(56) References Cited

U.S. PATENT DOCUMENTS

| | | |
|---|---|---|
| 7,016,939 B1 | 3/2006 | Rothwell et al. |
| 7,062,498 B2 | 6/2006 | Al-Kofahi et al. |
| 7,072,942 B1 | 7/2006 | Maller |
| 7,089,241 B1 | 8/2006 | Alspector et al. |
| 7,092,992 B1 | 8/2006 | Yu |
| 7,133,898 B1 | 11/2006 | Malik |
| 7,149,778 B1 | 12/2006 | Patel et al. |
| 7,174,303 B2 | 2/2007 | Glazer et al. |
| 7,177,905 B1 | 2/2007 | Slutsman et al. |
| 7,188,073 B1 | 3/2007 | Tam et al. |
| 7,200,606 B2 | 4/2007 | Elkan |
| 7,249,175 B1 | 7/2007 | Donaldson |
| 7,283,970 B2 | 10/2007 | Cragun et al. |
| 7,587,327 B2 | 9/2009 | Jacobs et al. |
| 7,870,200 B2 | 1/2011 | Slater et al. |
| 2001/0027472 A1 | 10/2001 | Guan |
| 2001/0027481 A1 | 10/2001 | Whyel |
| 2001/0032245 A1 | 10/2001 | Fodor |
| 2001/0054072 A1 | 12/2001 | Discolo et al. |
| 2002/0023132 A1 | 2/2002 | Tornabene et al. |
| 2002/0032602 A1 | 3/2002 | Lanzillo, Jr. et al. |
| 2002/0035493 A1 | 3/2002 | Mozayeny et al. |
| 2002/0049751 A1 | 4/2002 | Chen |
| 2002/0055940 A1 | 5/2002 | Elkan |
| 2002/0078158 A1 | 6/2002 | Brown et al. |
| 2002/0083068 A1 | 6/2002 | Quass et al. |
| 2002/0099938 A1 | 7/2002 | Spitz |
| 2002/0104021 A1 | 8/2002 | Gross |
| 2002/0116463 A1 | 8/2002 | Hart |
| 2002/0116506 A1 | 8/2002 | Lautner |
| 2002/0116508 A1 | 8/2002 | Khan et al. |
| 2002/0116641 A1 | 8/2002 | Mastrianni |
| 2002/0124170 A1 | 9/2002 | Johnson, Jr. |
| 2002/0132607 A1 | 9/2002 | Castell et al. |
| 2002/0143770 A1 | 10/2002 | Schran et al. |
| 2002/0147754 A1 | 10/2002 | Dempsey et al. |
| 2002/0147777 A1 | 10/2002 | Hackbarth et al. |
| 2002/0156895 A1 | 10/2002 | Brown |
| 2002/0166117 A1 | 11/2002 | Abrams et al. |
| 2002/0181703 A1 | 12/2002 | Logan et al. |
| 2002/0184624 A1 | 12/2002 | Spencer |
| 2002/0194502 A1* | 12/2002 | Sheth ............... G06F 17/30873 726/4 |
| 2002/0199095 A1 | 12/2002 | Bandini et al. |
| 2003/0009385 A1 | 1/2003 | Tucciarone et al. |
| 2003/0023736 A1 | 1/2003 | Abkemeier |
| 2003/0028606 A1 | 2/2003 | Koopmans et al. |
| 2003/0036941 A1 | 2/2003 | Leska et al. |
| 2003/0037041 A1 | 2/2003 | Hertz |
| 2003/0050986 A1* | 3/2003 | Matthews ............ G06Q 10/109 709/206 |
| 2003/0056100 A1 | 3/2003 | Beatson |
| 2003/0069874 A1 | 4/2003 | Hertzog et al. |
| 2003/0095527 A1 | 5/2003 | Shanbhag |
| 2003/0101181 A1 | 5/2003 | Al-Kofahi et al. |
| 2003/0110181 A1 | 6/2003 | Schuetze et al. |
| 2003/0110212 A1 | 6/2003 | Lewis |
| 2003/0167311 A1 | 9/2003 | Kirsch |
| 2003/0172167 A1 | 9/2003 | Judge et al. |
| 2003/0172291 A1 | 9/2003 | Judge et al. |
| 2003/0172294 A1 | 9/2003 | Judge |
| 2003/0191969 A1 | 10/2003 | Katsikas |
| 2003/0195937 A1 | 10/2003 | Kircher, Jr. et al. |
| 2003/0212791 A1 | 11/2003 | Pickup |
| 2003/0222912 A1* | 12/2003 | Fairweather .......... G06F 9/4436 715/763 |
| 2003/0231207 A1 | 12/2003 | Huang |
| 2003/0233418 A1 | 12/2003 | Goldman |
| 2003/0236847 A1 | 12/2003 | Benowitz et al. |
| 2004/0029087 A1 | 2/2004 | White |
| 2004/0039912 A1 | 2/2004 | Borrowman et al. |
| 2004/0044996 A1 | 3/2004 | Atallah |
| 2004/0111478 A1 | 6/2004 | Gross et al. |
| 2004/0128355 A1 | 7/2004 | Chao et al. |
| 2004/0139327 A1 | 7/2004 | Brown et al. |
| 2004/0176072 A1 | 9/2004 | Gellens |
| 2004/0181462 A1 | 9/2004 | Bauer et al. |
| 2004/0255120 A1 | 12/2004 | Botti et al. |
| 2006/0027648 A1 | 2/2006 | Chea |
| 2006/0036701 A1 | 2/2006 | Bulfer et al. |
| 2006/0095527 A1 | 5/2006 | Malik |
| 2006/0190481 A1 | 8/2006 | Alspector et al. |
| 2009/0006842 A1 | 1/2009 | Ross et al. |
| 2009/0006860 A1 | 1/2009 | Ross |
| 2011/0106894 A1 | 5/2011 | Hodge et al. |

FOREIGN PATENT DOCUMENTS

| | | |
|---|---|---|
| EP | 0276426 A1 | 8/1988 |
| EP | 0276428 A2 | 8/1988 |
| EP | 0276429 A2 | 8/1988 |
| EP | 0323703 A2 | 7/1989 |
| EP | 0326778 A2 | 8/1989 |
| EP | 0851355 A2 | 7/1998 |
| EP | 0942374 A1 | 9/1999 |
| EP | 0982927 A1 | 3/2000 |
| EP | 1122672 A2 | 8/2001 |
| EP | 1168167 | 1/2002 |
| EP | 1168167 A2 | 1/2002 |
| EP | 2364474 | 1/2002 |
| EP | 2364474 A2 | 9/2011 |
| GB | 2364474 | 1/2002 |
| JP | 411187235 A | 7/1999 |
| JP | 2000-261493 A | 9/2000 |
| JP | 2001-125851 A | 5/2001 |
| JP | 2001-167158 A | 6/2001 |
| JP | 2001-190133 | 7/2001 |
| JP | 2002-163341 A | 6/2002 |
| JP | 7-200343 | 8/2007 |
| WO | WO 99/10817 | 3/1999 |
| WO | WO 01/27873 | 4/2001 |

OTHER PUBLICATIONS

"Novelty Search Results 2003".
"Microsoft Office 2003—Microsoft TechNet", Apr. 1, 2003.
Hu, , "Yahoo Adds Spam filter to Email, But Will it Work?", Jan. 2, 2002, pp. 1-2.
Padwick, , "Special Edition Using Microsoft Outlook 2000", published May 12, 1999, pp. 1-3.
Plaxo, , "Company Overview", www.plaxo.com, 2002-2004.
Plaxo, , "Make it Easy to Keep Contact Information", www.plaxo.com, Nov. 12, 2002.
Plaxo, , "Management Team", www.plaxo.com, 2002-2004.
Plaxo, , "Product Overview", www.plaxo.com, 2002-2004.
Plaxo, , "Update Your Address Book", www.plaxo.com, 2002-2004.
Slipstick, , "To Add Addresses Automatically", published Jun. 7, 2002, pp. 1-2.
"Cloudmark,", home products support company, www.cloudmark.com, Jun. 24, 2002, 17 pgs.
A Way to Stop Spam Messages, groups.google.com/groups?q=%B%22sender%22+%2Bspam&start=10&hl=en&lr . . . , Apr. 25, 2003, 4 pgs.
Admediation: New Horizons in Effecrtive Email Advertising, Communications of the ACM archive, ISSN 0001-0782, vol. 44, iss. 12, Dec. 2001, pp. 91-96.
Agung, A Three-Party HTTP Proxy to Support Internet Content Regulation, Australasian Conference on Information Security and Privacy, 2000, pp. 1-7.
Alspector, Final Office Action, U.S. Appl. No. 11/380,375, Jan. 20, 2010, 16 pgs.
Alspector, Office Action, U.S. Appl. No. 10/740,821, Feb. 24, 2005, 21 pgs.
Alspector, Office Action, U.S. Appl. No. 10/740,821, Jul. 28, 2005, 24 pgs.
Alspector, Office Action, U.S. Appl. No. 11/380,375, Jun. 15, 2009, 21 pgs.
Alspector, Office Action, U.S. Appl. No. 11/380,375, Oct. 29, 2008, 19 pgs.

(56) References Cited

OTHER PUBLICATIONS

Alspector, Office Action, U.S. Appl. No. 11/380,375, Mar. 31, 2008, 17 pgs.
America Online Inc., International Preliminary Report on Patentability, PCT/US2004/001784, Jul. 29, 2005, 7 pgs.
America Online Inc., International Preliminary Report on Patentability, PCT/US2004/001788, Jul. 29, 2005, 9 pgs.
America Online Inc., International Preliminary Report on Patentability, PCT/US2004/043643, Jul. 3, 2006, 6 pgs.
America Online Inc., International Search Report and Written Opinion, PCT/US2004/001784, Jan. 13, 2005, 9 pgs.
America Online Inc., International Search Report and Written Opinion, PCT/US2004/001788, Mar. 10, 2005, 10 pgs.
America Online Inc., International Search Report and Written Opinion, PCT/US2004/043643, May 26, 2005, 5 pgs.
America Online Inc., International Search Report, PCT/US01/18556, May 6, 2002, 3 pgs.
An Analysis of Spam Filters, A Mayor Qualifying Project Report, Worcester Polytechnic Institute, Apr. 2003.
Androutsopoulos, A Comparison of a Naïve Bayesian and a Memory-Based Approach, KDD'2000, 2000, pp. 01-13.
Androutsopoulos, An Evaluation of Naïve Bayesian Anti-Spam Filtering, ECML-2000, 2000, pp. 09-17.
Androutsopoulos, An Experimental Comparison of Naïve Bayesian and Keyword-Based Anti-Spam Filtering with Encrypted Personal E-mail Messages, SIGIR-2000, 2000, pp. 160-167.
Anti-spam service battles bugs, msnbc-cnet.com/2100-1023-938103.html?type=pt&part=msnbc&tag=alert&form=f, Jun. 20, 2002, 3 pgs.
AOL Instant Messenger Windows Beta Features, AOL Instant Messenger All New Version 2.0, What is AOL Instant Messenger, Quick Tips for Getting Started; Frequently Asked Questions About AOL Instant Messenger, Jun. 24, 1999, 18 pgs.
AOL Technology: turning complicated things into engaging services, 1996 Annual Report, 22 pgs.
Bee Staff Reports, Governor wants to meet with refugee leaders, Modesto Bee, Mar. 5, 1989, p. 2B.
Bennett, Assessing the calibration of naïve bayes' posterior estimates, Dept. of Comp. Sci., Carnegie Mellon University, 2000, 10 pgs.
Better Bayesian Filtering, www.paulgraham.com/better.html, Jan. 2003, pp. 1-11.
Bott, Special Edition using Microsoft Office 2000, Que Publishing, 1999, p. 772-78.
Bradley, The use of the area under the ROC curve in the evaluation of machine learining algorithms, Patter Recognition, vol. 30, No. 7, 1997, pp. 1145-1159.
Breiman, Bagging predictors, Machine Learning, vol. 24, 1996, pp. 123-140.
Breiman, Out-of-bag estimation, Tech. Report, Dept. of Statistics, UC Berkeley, CA, 1996.
Brin, Copy detection mechanisms for digital documents, SIGMOD, 1995, pp. 398-409.
Broder, On the resemblance and containment of documents, SEQS: Sequences '91, 1998.
Broder, Syntactic clustering of the web, www.hpl.hp.com/techreports/Compaq-DEC/SRC-TN-1997-015.pdf, 1997.
Brown, Email with Netscape, Using Netscape 2, Chapter 13, Que Corporation, Jan. 1996, pp. 327-352.
Brown, Support Vector Machine Classification of Microarray Gene Expression Data, Tech. Report, UCSC-CRL-99-09, UC Santa Cruz, 1999.
Buckley, The smart/empire tipster IR system, TIPSTER Phase III Proceedings, 2000.
Chowdhury, Collection statistics for fast duplicate document detection, ACM Transactions on Information Systems, vol. 20, No. 2, 2002, pp. 171-191.
Cobb, International Search Report, PCT/US98/17677, Dec. 29, 1998, 2 pgs.
Cohen, Fast effective rule induction, 12th Int'l Conf. on Machine Learning, 1995.
Cohen, Instant Messaging, PC Magazine, PC Labs, Apr. 13, 1999, 2 pgs.
Cohen, Learning Rules that Classify E-mail, AAAI Spring Symposium on Machine Learning in Information Access, 1996.
Controlling E-Mail Spam, spam.abuse.net/adminhelp/mail.shtml, Mar. 28, 2003, 5 pgs.
Cranor, Spam!, Communications of the ACM, vol. 41, No. 8, Aug. 1999, pp. 74-83.
Cybozu Office 4 Support, www.share360.com/support/office4/manuals/updates_-_Linux.all.html, Mar. 13, 2002.
Diederich, Authorship Attibution with Support Vector Machines, Proc. of the Learning Workshop, Snowbird, Utah, 2000.
Domingos, A general method for making classifiers cost-sensitive, KDD'99, ACM Press, 1999, pp. 155-164.
Drucker, Support Vector Machines for Spam Categorization, IEEE Transactions on Neural Networks, vol. 10, No. 5, 1999, pp. 1048-1054.
Drucker, Support Vector Machines for Spam Categorization, IEEE Transactions on Neural Networks, vol. 10, No. 5, Sep. 1999.
Dudley, Telstra targets Net spammers, www.news.com.au/common, Dec. 2, 2003, pp. 1-2.
Dumais, Inductive Learning Algorithms and Representaions for Text Categorization, 7th Int'l Conf. on Information and Knowledge Management, 1998, pp. 229-237.
Dwork, Pricing bia Processing or Combatting Junk Mail, IBM Research Division and Department of Applied Mathematics and Computer Science, Weizmann Institute of Science, 12 pgs.
Ephrati, A Non-Manipulable Meeting Scheduling System.
Eyheramendy, On the Naïve Bayes model for text categorization, 9th Int'l Workshop on Artificial Intelligence and Statistics, 2003.
Fawcett, ROC graphs: notes and practical considerations, Tech. Report HPL-2003-4, HP Lbs, 2003.
Foiling Spam with an Email Password System, www.uwasa.fi/~ts/info/spamfoil.html, Jun. 28, 2004, 10 pgs.
FTC prepares to bust spammers, msnbc-cnet.com/2100-1023-834044.html?tag=bp1st, Feb. 11, 2002, 2 pgs.
Garrido, Cognitive Modeling and Group Adaptation in Intelligent Multi-Agent Meeting Scheduling.
Garrido, Multi-Agent Meeting Scheduling: Preliminary Experimental Results.
Gavin, How to Advertise Responsibly Using E-Mail and Newsgroups or—how NOT to Make Enemies Fast!, ftp.rfc-editor.org/in-notes/fyi/fyi28.txt, Nov. 7, 2002, pp. 1-27.
Habeas, Habeas Frequently Asked Questions, Oct. 3, 2002.
Hall, A Countermeasure to Duplicate-detecting Antipspam Techniques, Tech. Report 99.9.1, AT&T Labs, 1999.
Hammami, WebGuard: Web based Adult Content Detection and Filtering System, IEEE 0-7695-1932, WI'03, Jun. 2003, pp. 1-5.
Hearst, Support Vector Machines, IEEE Intelligent Systems, Jul./Aug. 1998.
Heintze, Scalable document fingerprinting, USENIX Workshop on Electronic Commerce, Nov. 1996.
Hidalgo, Combining Text and heuristics for Cost-Sensitive Spam Filtering, CoNLL-2000, Lisbon, Portugal, 2000.
Hird, Technical Solutions for Controlling Spam, Proc. Aug. 2002, Melbourne, Australia, Sep. 4-6, 2002.
Hoad, Methods for identifying versioned and plagiarized documents, J. American Society for Information Science and Technology, 2002.
Hoffman, Unsolicited Bulk Email: Mechanisms for Control, Internet Mail Consortium Report UBE-SOL, IMCR'005, Oct. 13, 1997, 31 pgs.
Hoffman, Unsolicited Bulk Email: Mechanisms for Control, Internet Mail Consortium Report UBE-SOL, IMCR'008, May 4, 1998, 16 pgs.
How to Make SURE a Human is Sending You Email, groups.google.com/group/news.admini.net-abuse.usenet/msg/e601783e8f40c545?d . . . , 2 pgs.
International Search Report, PCT/US04/01784, Jan. 13, 2004.
Internet is Losing Ground in the Battle Against Spam, The New York Times, NyTimes.com, Apr. 2003, pp. 1-4.

(56) References Cited

OTHER PUBLICATIONS

Joachims, Text Categorization with Support Vector Machines: Learning with Many Relevant Features, ECML'98, 1998, pp. 137-142.

Joachims, Text Categorization with Support Vector Machines: Learning with Many Relevant Features, LS-8 Report, Computer Science Dept., U. of Dortmund, 1998.

Kaitarai, Filtering Junk E-mail: A performance comparison between genetic programming and naïve Bayes, Tech. Report presented at Fall 1999 Mtng of the CMU Text Learning Group, Dept. of Elect/Computer Engineering U. of Waterloo, Nov. 1999.

Kangasharju, Secure and Resilient Peer-to-Peer Email: Design and Implementation, IEEE 0-7695-203, P2P'03, May 2003, pp. 1-8.

Kleinberg, Bursty and hierarchical structure in streams, KDD-2002, 2002.

Klensin, IMAP/POP Authorize Extension for Simple Challenge / Response, Sep. 1997, 5 pgs.

Kolcz, SVM-based Filtering of E-mail Spam with Content-specific Misclassification Costs, TextDM'2001, San Jose, CA, 2001.

Lewis, Naïve (Bayes) at forty, the independence assumption in information retrieval, ECML-1998, 1998, pp. 4-15.

Lin, Formulations of support vector machines: A note from an optimization point of view, Neural Computation, vol. 13, 2001, pp. 307-317.

Margineantu, Bootstrap methods for the cost-sensitive evaluation of classifiers, ICML-2000, 2000.

Marvin, Announce: Implementation of E-mail Spam Proposal, News.admin.net-abuse.misc, Aug. 2, 1996.

Massey, Learning Spam: Simple Techniques for Freely-Available Software, Computer Sci. Dept, Portland, Oregon, 2003, pp. 1-14.

Massey, Learning Spam: Simple Techniques for Freely-Available Software, USENIX'2003, 2003, pp. 63-76.

McCallum, A comparision of event models for Naïve Bayes text classification, AAAI-98, Madison, WI, 1998.

McCallum, Efficient clustering of high-dimensional data sets with application to reference matching, KDD-2000, 2000.

McLain, Office Monitor, CHI 1996 Conference on Human Factors in Computing Systems, Apr. 14-18, 1996.

Morik, Knowledge discovery and knowledge validation in intensive care, Artificial Intelligence in Medicine, vol. 19, 2000, pp. 225-249.

Moseley, The Basics of Outlook, Mastering Office 97 Professional Ed., Chapter 33, Microsoft, ISBN 0-7821-1925-5, 1997, pp. 753-763.

Muna, Message to mailing list[lmc-richmond] coordinating schedules = meetings, lists.indymedia.org, Sep. 2001.

My Spamblock, Was: Thwarting UCE address culling program, www.google.com/groups?hl=en&lr=lie=UTF-8&oe-UTG &selm+32E1A4FD.41C . . . , 28APR2033, 2 pgs.

NAGS Spam Filter, www.nags.org/spamfilter.html, Oct. 30, 1997, 11 pgs.

Naor, Verification of a Human in the Loop or Identification Via the Turing Test, Dept. of Applied Mathematics and Computer Science, Weizmann Institute of Science, Sep. 13, 1996, 6 pgs.

Net surfers set out to squelch spam, CNET News.com, msnbc-cnet.com.com/2100-1023-829399.html@tag=rn, Feb. 5, 2002, 4 pgs.

Nguyen, PHEmail: Designing a Privacy Honoring Email System, ACM 1-58113-637, CHI'2003, Apr. 2003, pp. 922-928.

O'Grady, A Groupware Environment for Complete Meetings: U. of Calgary.

Padwick, Using Microsoft Outlook 2000, Que Publishing, May 12, 1999, p. 1-93.

Pantel, A Spam Classification & Organization Program, AAAI-98, Madison, WI, 1998.

Platt, Fast training of support vector machines using sequential minimal optimization, Advances in Kernel Methods—Support Vector Learning, MIT Press, 1999.

Privacy Recovery with Disposable Email Addresses, IEEE Security Privacy, ISBN 1540-7993/03, 2003, pp. 35-39.

Provost, Naïve-Bayes vs. Rule-Learning in Classification of Email, Tech. Report, Dept of Computer Sciences, U. of Texas, Austin, TX, 1999.

Provost, Robust Classification for Imprecise Environments, Machine Learning, vol. 42, 2001, pp. 203-231.

Redmond, AlterEgo E-Mail Filtering Agent—Using CBR as a Service, AAAI-98, Workshop on Case-Based Reasoning Integrations, Madison, WI, 1998.

Rennie, An Application of Machine Learning to E-mail Filtering, KDD-2000, Workshop on Text Mining, 2000.

Rennie, Improving Multi-Class Text Classification with Naïve Bayes, Tech. Report ATTR-2001-004, MIT, 2001.

Resnick, Internet Message Format, RFC 2822, Apr. 2001.

Rudd, Winning the PC Shell Game, Today's Office, Jan. 1989.

Sahami, A Bayesian Approach to Filtering Junk E-mail, AAAI-98, Workshop on Learning for Text Categorization, Madison, WI, 1998.

Sakkis, Stacking Classifiers for Anti-Spam Filtering of E-Mail, EMNLP-2001, Carnegie Mellon University, 2001, pp. 44-50.

Salton, A vector-space model for automatic indexing, Communications of the ACM, vol. 18, 1975.

Sanderson, Duplicate detection in the Reuters collection, Tech. Report TR-1997-5, Dept. of Computing Science, U. of Glasgow, 1997.

Sarawagi, Interactive deduplication using active learning, KDD-2002, 2002.

Schohn, Active Learning with Support Vector Machines, ICML-2000, San Francisco, CA, 2000, pp. 839,846.

Segal, An Intelligent Asisstant for Organizing E-Mail, 3rd Int'l Cong. on Autonomous Agents, 1999.

Segal, Incremental Learning in SwiftFile, ICML-2000, 2000.

Sen, A Formal Study of Distributed Meeting Scheduling.

Sen, An Automated Distributed Meeting Scheduler; Dept. of Mathematical & Computer Sciences, U. of Tulsa.

Sen, Satisfying User Preferences While Negotiating Meetings; Dept. of Mathematics & Computer Sciences, U. of Tulsa.

Shivakumar, A Copy Detection Mechanism for Digital Documents, DL'95, Austin, TX, 1995.

Start-up wants your held to fight spam, CNET News.com Review-700XL, msnbc-cnet.com.com/2100-1023-937300.html?tag=rn, Jun. 19, 2002, 3 pgs.

Syroid, Outlook 2000 in a Nutshell, O'Reilly Media Inc., May 2, 2000, p. 1-28.

Take a Number Systems, Turn-O-Matic, Oct. 25, 2001.

Tarpitting with qmail-smtpd, www.palimine.net/qmail/tarpit.html, 1 pg.

The Big Picture, CNET Neews.com Review—700XL, msnbc-cnet.com.com/2104-10230938103.html, Jun. 24, 2002, 2 pgs.

The Penny Black Project, research.microsoft.com/research/sv/PennyBlack, May 8, 2006, 2 pgs.

Vapnik, Statistical Learning Theory, Chapter 10, John Wiley, NY, 1998.

Vipul's Razor, razor.sourceforge.net, Jun. 24, 2002, 23 pgs.

Wahba, Support vector machines, reproducing kernel Hilbert spaces and the randomized GACV, Advances in Kernel Methods: Support Vector Learning, MIT Press, 1999, pp. 69-88.

Weiss, The Effect of Class Distribution on Classifier Learning: An Empirical Study, Tech. Report ML-TR-44, Dept. of Computer Science, Rutgers U., 2002.

Winkler, The State of Record Linkage and Current Research Problems, Tech. Report, Statistical Research Division, U.S. Bureau of Census, Washington, DC 1999.

Woolridge, Qmail-spamthrottle(5)—the spam throttle mechanism, spamthrottle.qmail.ca/man/qmail-spamthrottle.5.html, pp. 1-4.

Yahoo! Messenger Makes the World a Little Smaller, More Informed, Jun. 21, 1999, pp. 1-2.

Yang, A Comparative Study on Feature Selection in Text Categorization, ICML'97, 1997, pp. 412-420.

Zadrozny, Learning and making decisions when costs and probabilities are both unknkown, Tech. Report CS2001-0664, U. of California San Diego, 2001.

Zaragoza, Learning to Filter Spam E-Mail: Comparison of a Naïve Bayesian and a Memory-Based Approach, 4th European Conf. on

(56) References Cited

OTHER PUBLICATIONS

Principles and Practice of Knowledge Discovery in Databases, Lyon, France, Sep. 2000, pp. 1-12.
Zaragoza, Machine Learning and Textual Information Access, KDD'2000, Lyon, France, Sep. 2000, pp. 1-13.
Zaragoza, The perception algorithm with uneven margins, ICML 2002, 2002, pp. 379-386.

* cited by examiner

500b

△ My Address Card

📇 My Address Card Setup    [Preferences] [Help]

| Personal Information | Work Information | —520

Work

- Company: [_____]
- Title/Position: [_____]
- Address: [_____]
  - [_____]
  - [_____]
- City: [_____]
- State/Providence: [__]    Zip: [__]
- Country: [_____]
- E-Mail: [_____]    ○ Primary e-mail address

[Work ▽] [_____]
[Fax ▽] [_____]

☐ Use work as my primary postal address

[Save] [Cancel]
  512      513

SYSTEM AND METHOD FOR COMMUNITY CENTRIC RESOURCE SHARING BASED ON A PUBLISHING SUBSCRIPTION MODEL

CROSS REFERENCE TO RELATED APPLICATION

This application is a continuation of U.S. patent application Ser. No. 12/784,737, filed May 21, 2010, which is a continuation of U.S. patent application Ser. No. 10/606,021, filed Jun. 24, 2003 now U.S. Pat. No. 7,739,602, all of which are incorporated herein in their entirety by this reference thereto.

BACKGROUND OF THE INVENTION

Technical Field

The invention relates generally to Internet based information sharing technology. More particularly, this invention relates to a system and method for providing a scheme for dynamic Web service which enables registered users to interactively share their digital resources with other registered users and non-registered users based on categorized sharing relationships with respect to different views of the digital resources.

Description of the Prior Art

The development of Internet technology has provided a vast new world of resource sharing. Digital files, such as text, photos, and audio/video programs, can be shared with almost any number of designated recipients in just a few seconds via e-mail. News, magazines and other resources can be digitally delivered from a central repository to many users based on subscription policies. Internet service providers now provide group e-mail services in which a registered user subscribes a service or services in connection with a specific group or several groups. Some other companies provide Internet based solutions to automatically update address book or contact information.

One such service, for example, is "Yahoo! Group" (http://groups.yahoo.com/), which provides an easy way for groups of people to communicate on the Internet—discussing sports, health and current events with a group of people, sharing photos and files, planning events, sending newsletters; and staying in touch with friends and family. To start a group, the user needs first to select a "Yahoo! Groups Category" by browsing or searching for the category that best describes his group. Then, the user needs to describe his group. This includes giving a "group name"; entering the group's e-mail address and giving a brief description about the group. When the user sends a message to the group e-mail address, all members of this group receives a copy of the message. A recipient of the message can unsubscribe from the group messages by returning an e-mail or clicking a URL embedded in the message.

Plaxo, Inc. (www.plaxo.com), for example, has developed an address book updating application which enables a user to automatically update his address books. Immediately after the user downloads the application, he is prompted to choose which people from his address book he wants to get updated contact information from. The user may choose as many people as he likes. The application then, on behalf of the user, sends out a simple message to each of the selected people, showing the contact information the user currently has in his address book on them and requesting them to correct the out-of-date information. The replies to these e-mails are processed by the application and automatically inserted into the user's address book. The user receives notifications from Plaxo as the updates replies come in. The user can also use Plaxo to send his own updated contact information to the selected people in his address book. Plaxo allows the user to create two cards, i.e. a business card and a personal card, so that the user can offer different information to different people. Once the user creates his cards, he can send them to anyone in his address book. If they are not Plaxo members, they will receive an e-mail containing the user's card. If they are Plaxo members and the user is in their address books, they receive a message asking them if they want to add the user. As friends and contacts join Plaxo, the user is automatically kept up-to-date without e-mails. The user's address book is automatically updated with the latest contact information of his friends and contacts that join Plaxo. This synchronization happens automatically on a daily basis as long as Outlook is running. The major weakness of Plaxo's solution is that until people download and use Plaxo, requests for contact information arrive in the form of e-mail, which may be construed as spam because it simply asks people for their information.

GoodContacts (www.goodcontacts.com) provides a solution to help a user to send a short e-mail message to the people that the user selects in his address book for verification. The e-mail incorporates a snapshot of the business card information the user has about them and asks them to review that information, make sure it is accurate, change it if it is wrong, and add anything that is missing. When they do so, the GoodContacts software updates the user's address book with the new information automatically. The user has the control to select the contacts he wants to verify. No e-mails are sent by the GoodContacts software without the user actively choosing to do so. To personalize the Good-Contacts e-mails to be sent out, the user can choose to use the text in one of the standard templates that comes with the software, or he can personalize the message and subject header to his taste. He can also purchase a customized template that incorporates his or an organization's logo and colors in every keep-in-touch e-mail he sends. The Good-Contacts software currently interfaces with Outlook, Outlook Express and ACT!. It does not store users' address books and thus unauthorized persons cannot access a user's address book and send spam to the user's contacts. The major weakness of the GoodContacts solution is its lower level automation because it has a very complicated setting feature, offering a suite of options for frequency of update requests, privacy settings, and sending requests to alternate e-mail addresses. Further, like Plaxo, until people download and use the software, requests for contact information arrive in the form of e-mail, which may be treated as spam.

AddresSender (www.addressendercorn) is a Web-based anywhere-accessible address book service that offers automatic updates within their network as well as synchronization capability with desktop PIMs. It forms links between one user and other AddresSender users to create a network and automatically sends and receives updates within the network. AddresSender's address book synchronizes with the user's Outlook (or OE or ACT!) contact list. It enables the user to send his information to his contacts. The user's in-network contacts get updates automatically; others get e-mails or even physical postcards. Unlike Plaxo and Good-Contacts, AddresSender does not automatically import contact information for anybody except other users in the AddresSender network.

CardScan (www.cardscan.com/accucard) offers scanners and text-recognition software for transferring business cards into the user's electronic address book. The software is bundled with AccuCard Service with a functionality to confirm the accuracy of contact information and keep the user's entire address book up-to-date automatically. Like Plaxo, the AccuCard Service stores address information on a central server. On a quarterly basis, the AccuCard asks the user's contacts to confirm or update their information. It reminds the user whether a contact in his address book is out-of-state (i.e. if there is new information for that contact on the AccuCard server). The user must view the updates and accept or reject the changes for that contact. AccuCard allows the user to choose whether to reveal his identity or include a personal message with requests for updates. It stores images of business cards as well as the information therein.

CardScan is compatible with Microsoft Outlook, ACT!, Lotus Notes, and over 30 more contact managers. It synchronizes with any Palm, Handspring or Sony handheld, most Pocket PCs and the web. No matter where the user keeps his contact information, it can be up-to-date all the time. The primary weakness of this system is in privacy and control. For example, few controls are offered for distribution of information. Data need not originate with the contact himself, and updates are distributed to anyone who held the card originally. Update requestors need not reveal their identities though CardScan recommends that disclosing the requestor's name yields a better response rate. While this may be effective for a business application, it is not conducive to sharing personal information.

Now-defunct Ants.com developed a product called Scout for keeping address books up-to-date. It stores a user's "business card" information in a central database, and other Scout users who have that user's e-mail address could get the user's latest information automatically. Based on the e-mail address a user has, Scout automatically fills and automatically updates the user's Outlook address book with information from its database. Like several other products, Scout offers to send invitations for the user's other contacts to join. The critical weakness in Scout's model is that, although some limited restrictions can be set, it allows anyone with the user's e-mail address to get the rest of the data from the user's business card.

The approaches introduced above have many problems. For example, if a user wants to have a multiple-group sharing business, he has to set up many different groups manually and he has to spend a lot of time to manage these groups. For another example, if the user wants to send different views of a shared resource to different groups, he has to create different versions of the resource and send different versions to different groups manually. Further, when the shared resource is updated, the local copies cannot be automatically updated. Further more, the group members cannot interactively share a centric resource such as a calendar.

What is desired is a universal sharing scheme that includes the following features:

A convenient easy-to-use publishing subscription model for sharing, which puts a publisher in control about whom to share the resources and thus reduce privacy concerns;

A "My Community" centric management system, with which the publisher shares his resources with his own community only and, at the same time, his community is dynamically extended by accepting non-members to join;

A mechanism of multiple views based sharing, which enables the publisher to share different views of a shared resource and thus further reduces the privacy concerns;

A mechanism for automatically updating the shared resource within "My Community";

A flexible sharing model, with which different sharing relationships for different needs are defined; and A mechanism for integration of agents as sharing facilitators which enables the sharing process to be automated whenever possible and enables different applications to provide sharing functions.

SUMMARY

This invention provides a Web service which enables a publisher to share his digital resources with a number of subscribers based on different sharing relationships. The Web service includes an interface called "My Community", for example, with which the publisher manages the sharing relationships with his community members. In a preferred embodiment of this invention, a community member refers to a user in a UNIX or any computer system who has an account with the system. The community members are organized into different groups. Each group includes a number of community members who have a common sharing relationship with the publisher with respect to one or more views of the shared resources. A resource may have multiple views, such as "full view" v. "basic view" v. "professional view" of a digital address card, or "normal view" v. "personal view" v. "confidential view" of a calendar. Each of the views has Metadata describing sharing styles, as well as version, creation date, size, and the like. Each sharing style corresponds to a specific sharing relationship between a community member and the publisher.

In an equally preferred embodiment, an address card service is incorporated with the existing address book technology, which enables automatic sharing and updates of address book information. Members, i.e. registered users, can share ("publish") personal contact information, work information or/and personal notes with the people they want to stay in touch with. Those members can "subscribe" to automatically receive changes when the information is updated. The address card provides a link between members to help them stay in touch, and to keep their address books up-to-date with all the right information. The service ensures that the members always have the right contact information for their friends and family whenever they need it.

The address book is a central way for the user to share personal information and automatically keep it up-to-date. All his friends and family can always have his current contact information whenever he updates it and he never has to worry about mistyping a friend's new phone number or e-mail address to copy it into his address book because they can share it with him automatically.

Members can easily create an address card of personal and contact information. Even they can include self-expression elements such as Buddy Icon, personal/business logo, stationery, etc. Further, the member can create his address cards with different views for different audiences.

Members can share a personal address card with designated others. Sharing may take place via e-mail or a one-click communication mechanism. They can share an address card with all or part of the address book/"buddy list", leveraging the groups and categories of people in those lists. They can also share an address card with recipients of mail messages. They can even make an address card "public," open to subscription by any member.

Members with whom an address card is shared can accept the card to add that information to their address book. They receive automatic updates when the card is modified. They can choose to automatically accept address cards from contacts already in their address book or "buddy list" or contacts with whom they have shared. Where possible, address cards are resolved with existing entries in the subscriber's address book, using screen name and other key fields to detect duplicates.

A member can share his address card with another member (e.g. via Member Directory, Buddy Info). When a subscriber accepts, it is easy to reciprocate with a share.

When a member updates his address card, the modification is automatically reflected for subscribers with whom it is shared so that information is always up-to-date. It may include options to unsubscribe automatic updates on the publisher or subscriber side. It may also include an option to notify subscriber of updates so that new information is not missed.

Once a member has subscribed to an address card, the address card's information is available wherever the address book information is accessed. The subscriber may make edits to the local copy of the address card, but any edits are overwritten if the publisher updates the address card because the publisher's address card always contains the most up-to-date information.

The member's privacy is always protected. Policy for forwarding (i.e. passing on) another member's address card will limit or restrict the ability for forwarded cards to maintain subscriptions to the original card; original publisher must grant permission. Forwarding an invitation to request an address card affords the most control and privacy while still enabling the spread of address cards.

While the address card works best among registered members, it still supports sharing with non-members through export of standard contact card formats for a seamless sharing experience. Publishing to non-members includes e-mail based updates for published modifications.

A similar mechanism can enable sharing among a group, such as a Family, to which members can easily publish and subscribe to share updates among all members of the group.

The address card and group sharing models may be applied for sharing other member-created information and lists, such as "favorite place" and "buddy list".

The address card system disclosed herein has numerous advantages. For example: the publisher is in control of who receives which view of the address card; users have flexible preferences for automatically publishing or automatically subscribing address cards; unlike any prior art system which focuses on a "pull" model of soliciting other users' contact information, the address card system taught herein focuses on a "push" model of sharing publishers' information, allowing recipients to simply accept; it propagates automatic updates within an existing network of registered users; furthermore, it enables the users to easily choose groups or categories with which to share.

BRIEF DESCRIPTION OF DRAWINGS

FIG. 5B is a schematic diagram showing the UI setup page when the "Work Information" screen is at the front;

FIG. 5F is a schematic diagram showing an exemplary update screen with the "Personal Information" tab at the front;

FIG. 7E is an exemplary edit contact screen with the "Personal Information" tab at the front;

DETAILED DESCRIPTION OF THE INVENTION

The invention provides a Web service which enables a registered member, called a publisher, to share his digital resources, such as his address card or his calendar, with a number of subscribers based on different sharing relationships. The Web service includes a user interface, called "My Community" for example, with which the publisher manages the share-relationships with his community members. In the preferred embodiment of this invention, a community member refers to a registered user in a UNIX or any computer system who has an account in the system. The community members are organized into different groups. Each group includes a number of community members who have a common sharing relationship with the publisher with respect to one or more views of the resources. A resource may have multiple views, such as "full view" v. "basic view" v. "professional view" of an address card, or "normal view" v. "personal view" v. "confidential view" of a calendar. Each of the views has Metadata describing sharing-styles, as well as version, creation date, size, and the like. Each sharing style corresponds to a specific sharing relationship between a community member and the publisher.

Figure 1:
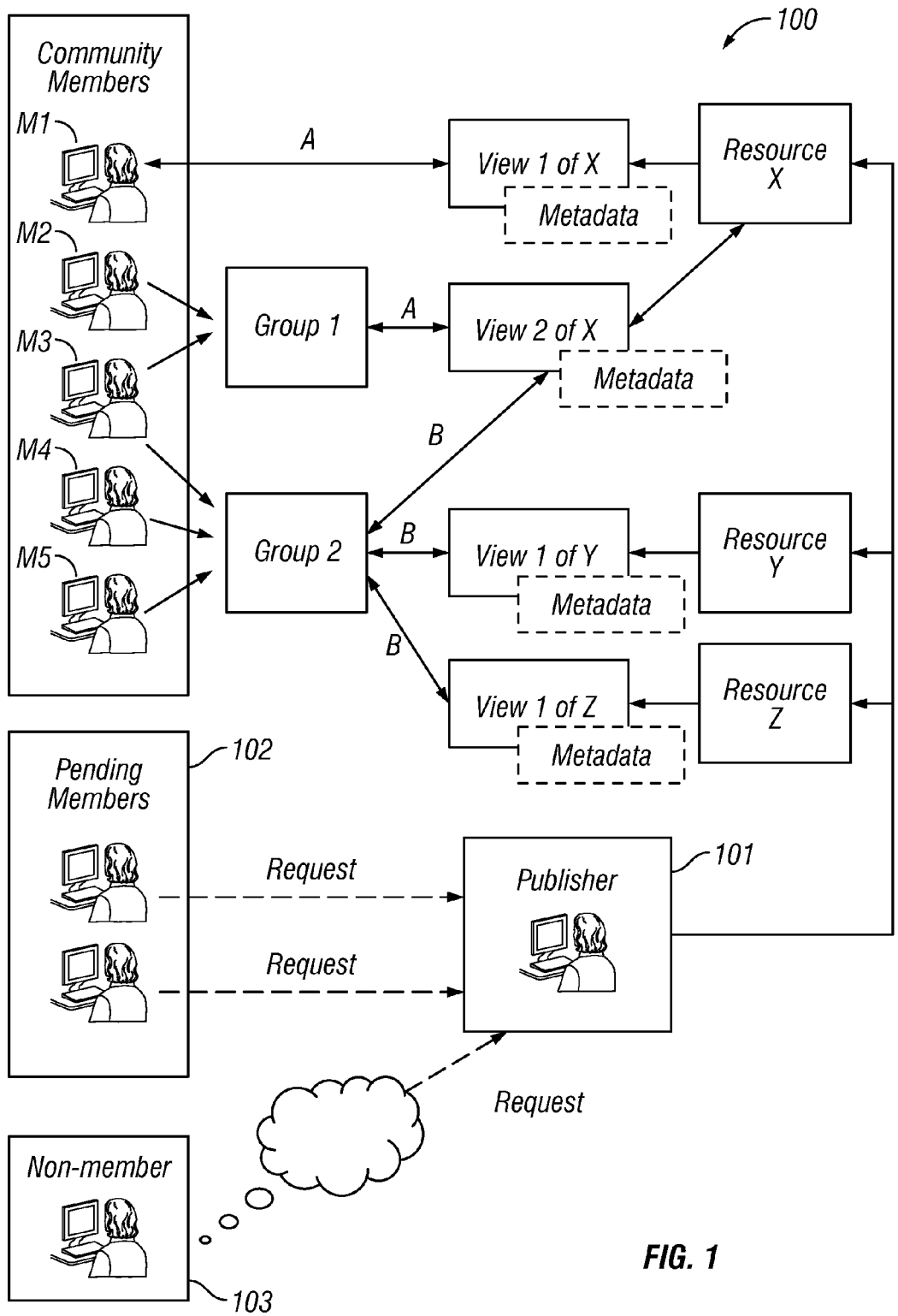
FIG. 1 is a schematic diagram illustrating an exemplary data model for a publisher's "My Community" according to this invention.

FIG. 1 is a schematic diagram illustrating an exemplary data model 100 for a publisher's "My Community". In this model, the publisher 101 has three resources, i.e. "Resource X", "Resource Y" and "Resource Z". "Resource X" has two views, i.e. "View 1 of X" and "View 2 of X". With respect to "View 1 of X", there is only one member, i.e. M1, under sharing relationship "A". However, with respect to "View 2 of X", "Group 1", which includes two members M2-3, is under sharing relationship "A", and "Group 2" which includes three members M3-5, is under sharing relationship "B". Note that a member can belong to different groups at the same time. For example, M3 belongs to both Group 1 and Group 2. After receiving the availability announcement from the publisher 101, the registered members 102 of the Web service who have not been designated as members of "My Community" send their subscription requests to the publisher 101. The non-members 103 who have not been registered with the Web service but have known the availability of the publisher's resource may also send their subscription requests to the publisher 101.

A sharing relationship defines what and how a specific group of community members can do on the shared resource during the life-span, i.e. the duration, of the sharing relationship. The life span may be "one-time only" or "ongoing". The following are three exemplary sharing relationships:

copy_send—a group of community members access a predefined view of a resource by receiving a copy of the view from a publisher. For example: assuming sharing relationship "A" is "Copy_send", M1 receives a copy of "View 1 of X"; the Group 1 members (M2 and M3) receive a copy of "View 2 of X".

Reference_read—the group of community members read a shared resource in a central repository such as a picture album or a calendar. For example: assuming sharing relationship "B" is "Reference_read", the Group 2 members (M3, M4, and M5) can read "View 2 of X", "View 1 of Y" and "View 1 of Z".

Reference_write—the group of community members write/update a shared resource. For example: Assuming the sharing relationship "A" is "Reference_write", the Group 1 members (M2 and M3) can update "View 2 of X".

Figure 2A:
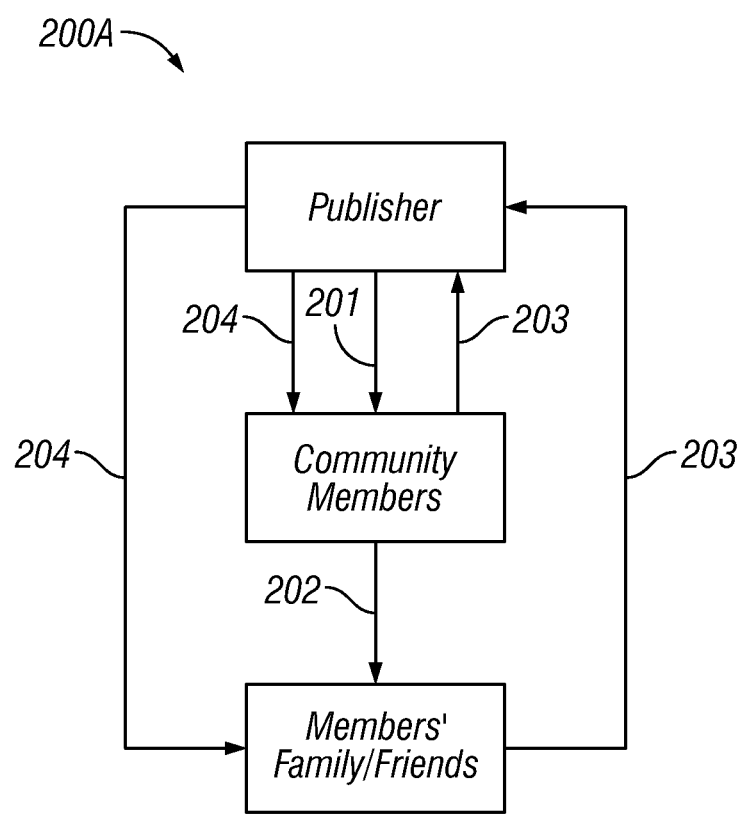
FIG. 2A is a flow model illustrating a process for resource sharing.

FIG. 2A is a flow model illustrating a process for resource sharing 200A which includes four basic steps:

Step 201: The publisher publishes an announcement to his community members;

Step 202: The community members forward the announcement to their family members or friends;

Step 203: Some community members and some non-members (i.e. member's family and friends) send subscription requests to the publisher; and Step 204: The publisher approves the subscription requests.

Figure 2B:
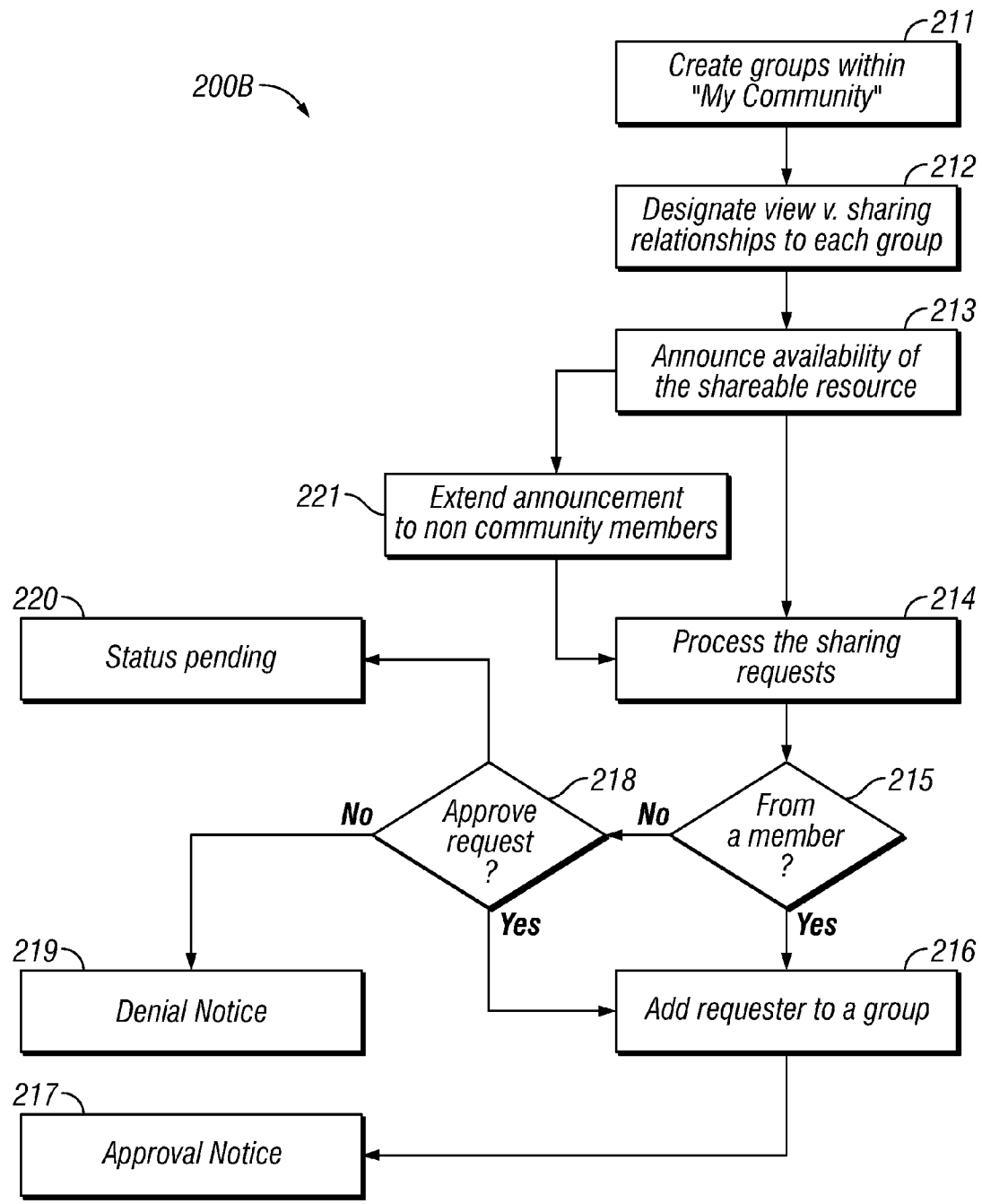
FIG. 2B is a flow diagram illustrating a process for resource sharing.

FIG. 2B is a flow diagram illustrating a process 200B for resource sharing, which includes the following steps:

Step 211: Create a number of groups inside "My Community". The number of members in each of the groups may start with zero initially.

Step 212: Designate a view of a sharable resource to some or all groups based on sharing relationships.

Step 213: Announce the availability of the views of the sharable resource and the sharing relationships to some or all of the publisher's community members.

Step 214: Process subscription requests. The requests are classified into different categories such as one-time sharing, on-going sharing and the like.

Step 215: Check whether the requester is a community member. If the requester is a community member, automatically approve the request.

Step 216: Add the requester to a group or groups.

Step 217: Notify the requester that his request has been approved.

Step 218: If the requester is not a community member, determine whether to approve the request. If yes, continue on Step 216.

Step 219: If the request is denied, send a denial notice.

Optionally, the process may further include Step 220 to hold the status pending.

Note that the publisher's "My Community" is dynamically extended because the existing community members spread the resource sharing announcements to non community members such as friends and family members. This is illustrated by Step 221. When a non community member submits his subscription request, his identity information such as name, e-mail address and his relationship with referral members should also be provided.

Under an ongoing type sharing relationship, whenever a shared resource is modified, community members' local copies are updated accordingly. In particular, the publisher first sends a change notification to the members who subscribed to the ongoing type relationship. In one option, a subscriber's local copy of the shared resource is automatically updated. In another option, when a subscriber receives the change notification, he can choose to update the local copy, not update, or choose to block future notification. In case he chooses to block future notification, the sharing relationship is modified on the publisher's side and thus the subscriber will no longer receive the change notification.

As mentioned above, the sharing relationships are managed via both the publisher's side and the subscriber's side. On the publisher's side, he can set the sharing preferences as to the groups that a resource should be shared with and relationships that should be applied for each group. The factors concerning the sharing relationship for each resource may include the groups/members that the resource is being shared with, current sharing relationship, life-span of the relationship (ongoing or one-time), status, and rejected sharing requests. For the publisher's community management, the system maintains a list of community members and their groups, a list of pending members and a list of rejected members. On the subscriber's side, he can set the sharing preferences as to the types of announcements that should be rejected and publishers from whom publishing is automatically applied after receiving an announcement. For example, the subscriber may set to block spam and set to automatically update the local copy of some resources upon receipt of the update notification. The factors concerning the sharing relationship for each resource may include a list of resources received, current sharing relationship, life-span of the relationship (ongoing or one-time) and status.

Figure 3:
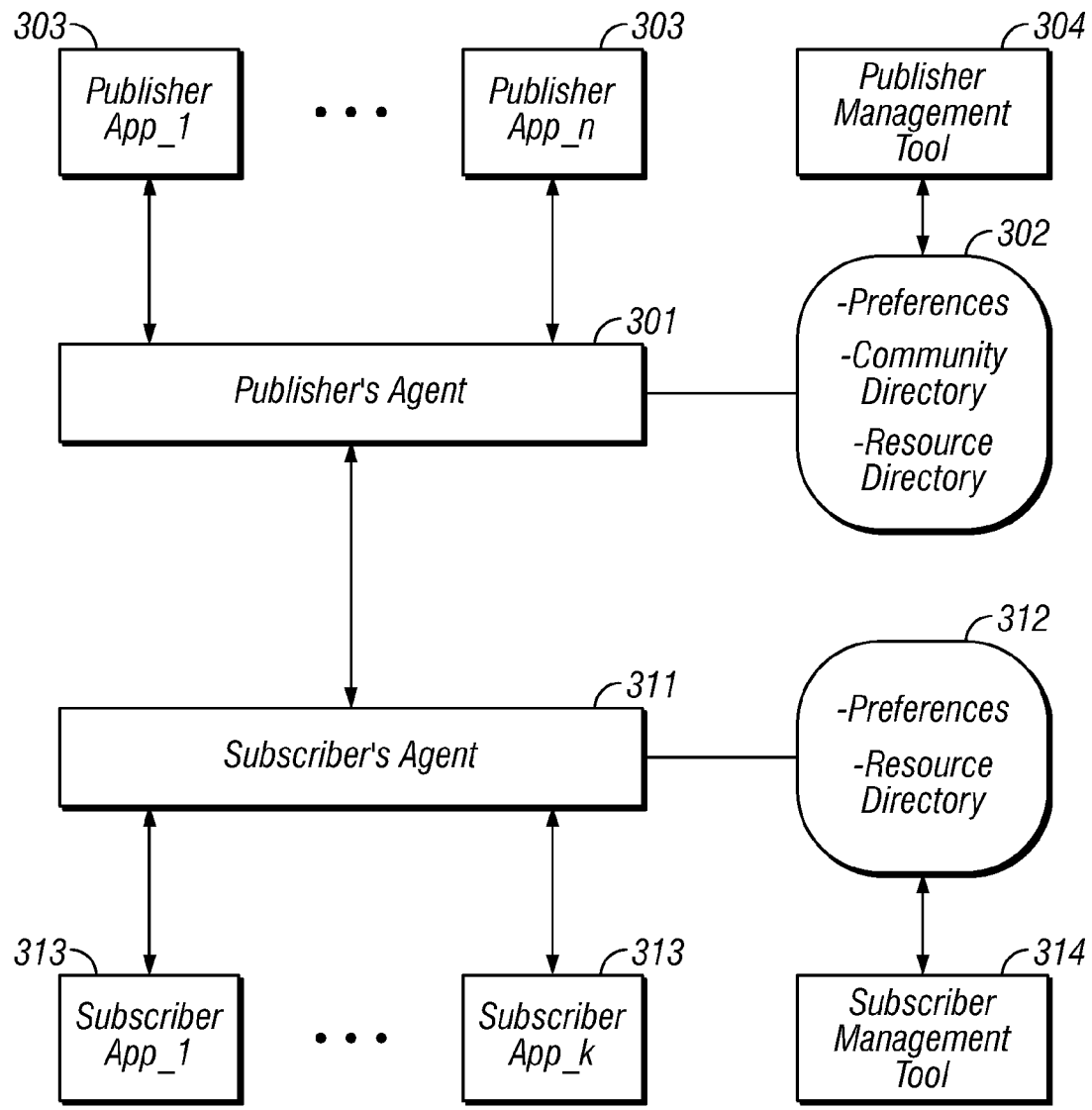
FIG. 3 is a schematic block diagram illustrating a sharing model where publisher's and subscriber's agents are used.

In an equally preferred embodiment of the invention, agents for facilitating resource sharing are used. FIG. 3 is a schematic block diagram illustrating publisher's and subscriber's agents. On the publisher's side, the agent 301 is located at some host servers or user's personal computer. The agent 301 serves as a gateway for all of the publisher's applications 303 to send out publishing announcements and change notifications, and to accept all requests from publishers including his community members and their friends or family members. The agent 301 may generate automatic responses to the requests in accordance with the publisher's preferences 302 thus minimize the publisher's manual interaction. On the subscriber's side, the agent 311 is located at some host servers or user's personal computer. The agent 311 serves as a gateway for all of the subscriber's applications 313 to accept the requests from publishers such as announcements and notifications, and to accept the requests from the peer subscribers such as forwarded announcements. The agent 311 may generate automatic responses in accordance with the subscriber's preferences 312. The agent 311 may also be used to invoke the subscriber's applications for accepting sharing. For example, the agent 311 updates the subscriber's address book after receiving a modified address card as described in the following paragraphs.

Figure 4:
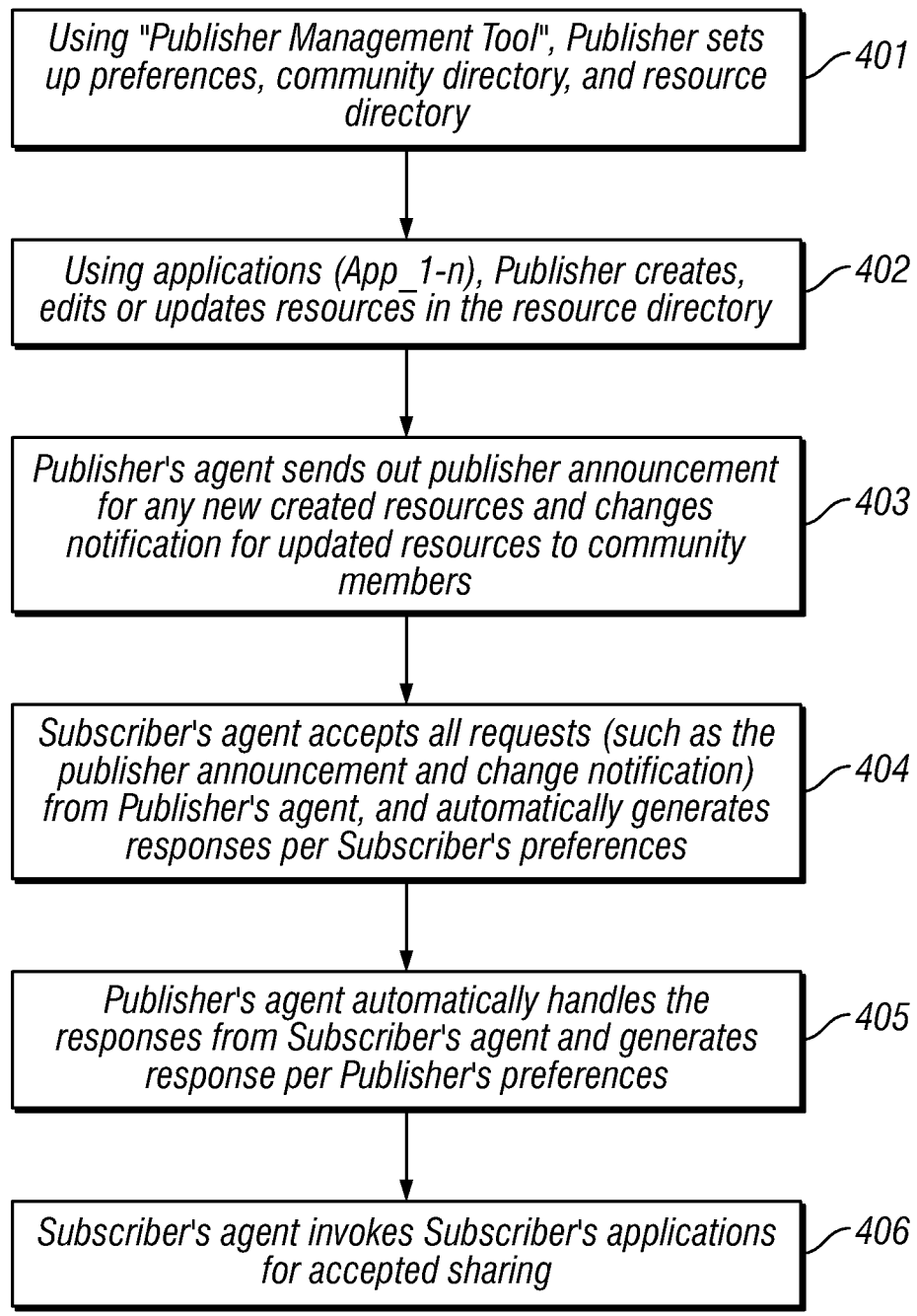
FIG. 4 is a flow diagram illustrating a process for facilitating resource sharing via agents.

FIG. 4 is a flow diagram illustrating a process for facilitating resource sharing via agents, which includes the following steps:

Step 401: A publisher uses "Publisher Management Tool" to setup preferences, community directory, and resource directory;

Step 402: The publisher uses applications to create, edit or update resources in the resource directory;

Step 403: The publisher's agent sends out publisher announcements for any new created resources and changes notification for updated resources to community members;

Step 404: The subscriber's agent accepts all requests (such as the publisher's announcement and change notification) from the publisher's agent, and automatically generates a response per the subscriber's preferences;

Step 405: The publisher's agent automatically handles the responses from the subscriber's agent and generates responses per the publisher's preferences;

Step 406: The subscriber's agent invokes the subscriber's applications for accepted sharing.

While a sharing service allows publishers to notify subscribers of their shared resources via e-mail etc., checks need to be in place to prevent this feature from being abused by spamming users. Therefore, in another equally preferred embodiment, a spam control mechanism is included. The spam control mechanism performs the following functions:

Rate limiting policies. For example, limit the number of notifications that a sender can send in a given time interval such as hourly, daily, weekly, and monthly.

Rate limiting notification to a unique receiver. For example, limit number of notifications that a sender can send to a given person in a given time interval.

Restriction on the number of publishes that can be made in one request/transaction.

Restriction on notification messages, such as size and content.

Such settings should be configurable by the system administrator without bringing down the system. It is hoped that having such policies in place should act as a deterrent to spammers from misusing sharing systems.

In an equally preferred embodiment, an Internet based address card service is incorporated with an existing address book service, which enables automatic sharing and updates of address book information. The members of the service can publish personal contact information, work information or/and personal notes with the people they want to stay in touch with. Those members can subscribe to automatically receive changes when the information is updated. The address card provides a link among the members to help them stay in touch, and to keep their address books up-to-date with all the correct information. The service ensures that the members always have the right contact information for their friends and family whenever they need it. By subscribing to the service, the user's friends and family can always have his current contact information whenever he updates it and he never has to worry about mistyping a friend's new phone number or e-mail address to copy it into his address book because they can share it with him automatically. Contact information in address cards is available via any interface to the host-based address book. The address card contact information is also available offline.

A user/member can easily set up a master address card of personal and contact information based on a template or templates provided by the service provider. Optionally, the user/member may choose to create his custom address cards. He can even include self-expression elements such as a "buddy icon", personal/business logo, stationery, etc. Based on the master address card, the user/member can create different address cards, or one address card with different views, for different audiences. If the user has more than one address card, he must indicate a default card. He can label each of his sub-cards, but the "label" itself is not published to the card subscribers. The user can edit the fields in his address cards by editing the master address card. When changes are saved, they are automatically published to subscribers of the address cards.

In a typical embodiment, the service provider provides templates from which a user/member selects sets of fields for sub-address cards. For example, the "Business" template may contain First Name, Last Name, Title, Company, Work Address, Work Phone, E-mail, and Web Page. These fields will be pulled from the address card and published as the user's "Business Card". Similarly, a different set of data may be pulled from the address card as the user's "Personal Contact Information".

A member/publisher can share his address card with certain designated recipients who may then choose to subscribe. Sharing may take place via e-mail or a new "direct" one-click communication mechanism. He can share an address card with all or part of the address book/"buddy list", leveraging "people lists". He can also share his address card with recipients of mail messages. He can even make his address card public, open to subscription by any member. The publisher may configure an expiration period of time for a publish offer or an invitation to share.

A member/subscriber with whom an address card is shared can accept the address card to add that information to his address book, and thereafter he receives automatic updates when the card changes. He may choose to automatically accept address cards from contacts already in his address book/"buddy list" or contacts with whom he has shared. Where possible, address cards are resolved with existing entries in the subscriber's address book, using screen name and other key fields to detect duplicates.

A member/publisher can share his address card with another member through various points of the service, e.g. via e-mail, instant messenger or online status displaying system such as AOL's Member Directory, Buddy Info Badge or People List. When a subscriber accepts, it will be easy to reciprocate with a share. A member/publisher may choose to publish to contacts not in his address book. In this case, these contacts can be manually or automatically added to the address book.

Conversely, if a member deletes a subscriber from his address book, the subscriber is then un-subscribed from the publisher's address card. The member can choose via member preferences to automatically publish his default address card to some or all of those in his address book. If he so chooses, an invitation to subscribe is automatically sent to the recipient.

When a member/publisher updates his address card, the modifications are automatically reflected for members with whom it is shared so that information is always up-to-date. It may include options to turn off automatic updates on the publisher or subscriber side. It may also include an option to notify the subscriber of updates so that new information is not missed. The user can view and manage accepted subscriptions. He may also view pending and rejected subscriptions. He may un-publish to subscribers and pending subscribers, i.e. break the connection or revoke the offer.

A member/user receives a share/publish offer in various forms, e.g. an immediate popup (if online), a popup at sign-on, an indicator in his address book, and an e-mail. The member with whom an address card is shared also has different options, e.g. (1) exchange: a member subscribes to the publisher's address card and reciprocates with a publishing of his own address card (if it exists, otherwise the member has the option to set one up); (2) accept the member subscribes to the publisher's address card only; and (3) reject the member does not subscribe to the publisher's address card.

A member/subscriber to whom an address card is published can choose to accept (subscribe). The publisher's address card information is added to the subscriber's address book, and the subscriber then receives automatic updates of modifications to the publisher's address card. A member must subscribe in order to accept address card data. He cannot just accept once without making the publish/subscribe connection. The member who has subscribed may later choose to unsubscribe.

A member/subscriber can specify whether published modifications to an address card to which he has subscribed may trigger a notification. He can also choose a notification method. He can specify whether each address card to which he has subscribed merits notification upon modification on a per-card basis. Notification may include details of specific changes made to the address card. The subscriber may choose to lock certain fields in an address card to which he has subscribed. This may prevent overwriting that field with any changes made by the publisher.

A member/subscriber can choose via member preferences to automatically accept an address card that is published to him. This means that the member automatically subscribes to any address card that is published to him. He can automatically accept address cards from the entire address book or the "buddy list". In that case, anybody listed in the member's address book or "buddy list" at a given moment is accepted automatically by the member when any of them publishes his address card.

Once a member/subscriber has subscribed to an address card of another member's, the address card's information is available wherever address book information is accessed (Mail, YGP, etc.). The subscriber may make edits to the "local" copy of the address card, but any edits are then overwritten if the publisher updates the address card because the publisher's address card always contains the most up-to-date information. If the member subscribes to multiple cards from the same publisher, these cards are merged as a single entry in the subscriber's address book. If an existing contact in the subscriber's address book has the same screen name and/or e-mail address as an address card to which he is subscribing, a duplicate is detected and the subscriber is prompted to an option whether to delete the duplicate. If the address card contains a superset of the duplicate entry, the existing entry is then replaced by the address card. Superset means that the content in all fields in the existing entry are matched exactly by the contents of the fields within the address card, and that the address card may also contain some additional fields where the existing entry is blank. If the address card intersects with an existing entry but is not a superset, the subscriber has the option to overwrite the existing entry with the received address card, or to keep them separate.

The member/subscriber can unsubscribe from an address card at any time. After the member has unsubscribed, he receives no further updates but the information he has already received remains in his address book as-is. If the subscriber deletes an address card to which he has subscribed, his subscription is eliminated accordingly.

While the address card works best among registered members, it still supports sharing with non-members through the export of standard contact card formats for a seamless sharing experience. Publish/subscribe for non-members includes e-mail based updates for published modifications. If a member/publisher chooses to publish his address card to a non-member contact, the non-member contact then receives a notification of the publication via e-mail with information embedded and a vCard attached that contains the member's address card information. The publisher can insert a personal note in the e-mail generated on an initial publish (This also applies to any mails sent to members). In the published e-mail sent to a non-member, the non-member can opt-in (subscribe) to future address card modifications via a link in the e-mail. If the non-member opts in, any modification made to the address card then generates an e-mail to him with updated information embedded and the vCard attached. Each update e-mail offers the ability to opt out (unsubscribe).

A similar mechanism can enable sharing among a group, such as a family, to which members can easily publish and subscribe to share updates among all members of the group. The address card and group sharing models may be applied for sharing other member-created information and lists, such as "favorite places" and "buddy list".

When a member/subscriber forwards an address card to a third party, the recipient receives a publish offer. Accepting the offer forms a publish/subscribe connection between the original publisher and the recipient. The original publisher is accordingly notified when the recipient has subscribed. Optionally, the original publisher is prompted to give permission to the recipient in order for a connection to be formed. The original publisher can set permissions on an address card, preventing subscribers from forwarding it. Default is to allow forwarding.

When a member/publisher sets a preference to automatically publish his address card to anybody to whom he sends mail, his default address card is published (unless otherwise specified). On a per-message basis, the member can choose whether his address card is automatically published to the mail recipient(s).

A member/subscriber can set a preference to automatically subscribe to anybody to whom he sends an e mail, if that contact is implicitly published. If the publisher publishes on "mail send", the recipient must be able to subscribe when he reads that mail. If the recipient/member chooses to "Add Sender to Address Book," he automatically subscribes to the sender's (publisher's) address card. Optionally, the recipient/member may choose to reciprocate with a publication to the sender.

The address card comprehends the parent control settings on the publisher side. Children do not have access to the address card. Young teens are prevented from publishing a public address card.

These are further illustrated by exemplary screens and pop-ups of a user interface (UI) implementing above described scheme.

Figure 5A:
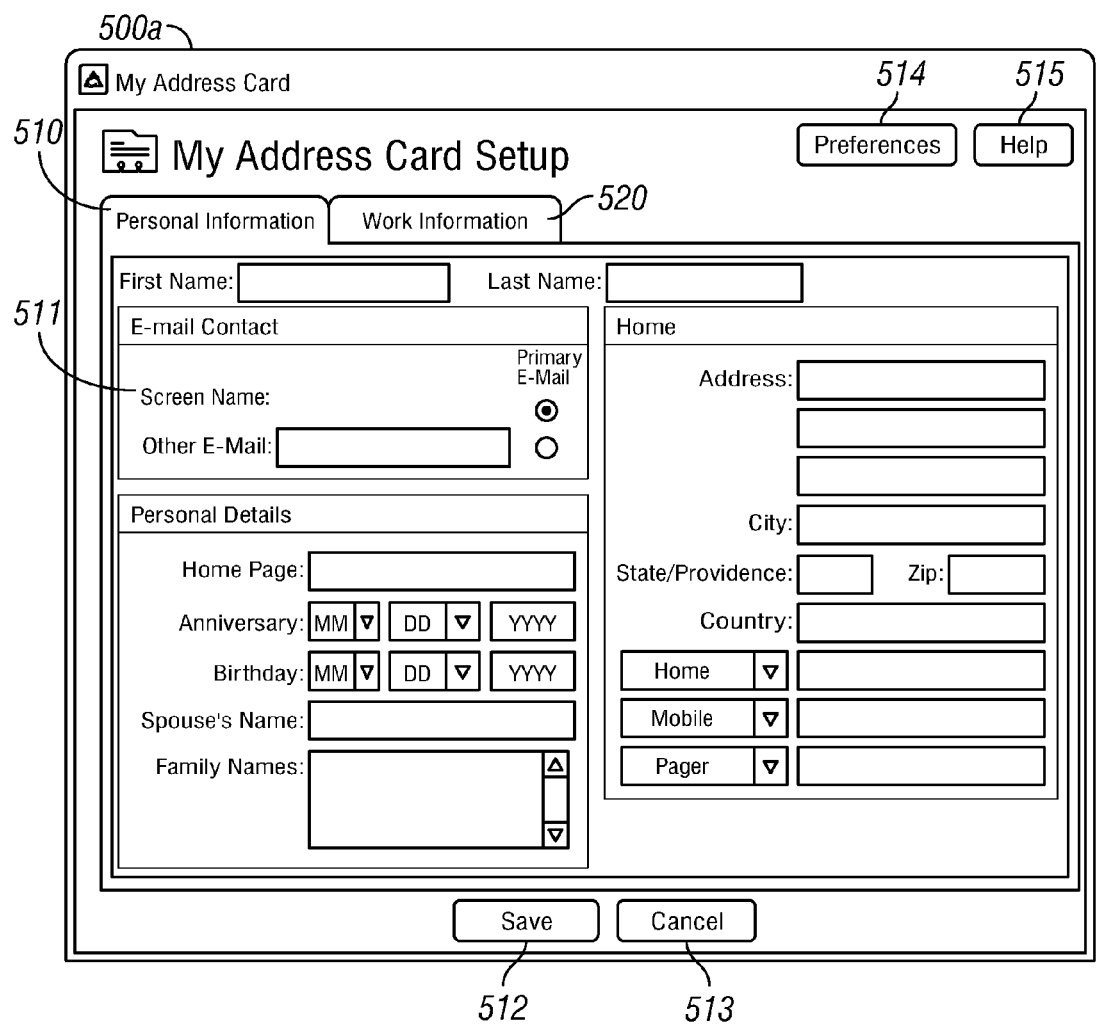
FIG. 5A is a schematic diagram showing an exemplary user interface (UI) for "My address card" with the "Personal Information" tab at the front.

FIG. 5A is a schematic diagram showing an exemplary UI for "My address card" 500a with the "Personal Information" tab 510 brought to the front. The user's setup page of the UI includes: a "Personal Information" tab 510, which is an area where a member, i.e. publisher, enters information about himself; a "Work Information" tab 520 which can be brought to the front when it is clicked; a "screen name" mark 511, which is permanent, i.e. hard-coded; a virtual "Save" button 512, which is used to save the entered data when it is clicked; a "Cancel" button 513; a "Preferences" button 514, from which the user may set his preferences; and a "Help" button 515, from which the user accesses to instructional information. The publisher's preferences may include options such as "auto-publish to his Address Book/Buddy List as contacts added", or "do not auto-publish". If the publisher chooses to set up "auto-publish", any member (account holder) registered with the Web service may subscribe to his address card.

FIG. 5B is a schematic diagram showing the UI setup page 500b when the "Work Information" screen 520 is brought to the front. From this page, the user enters his work information and saves it by clicking the save button 512.

Figure 5C:
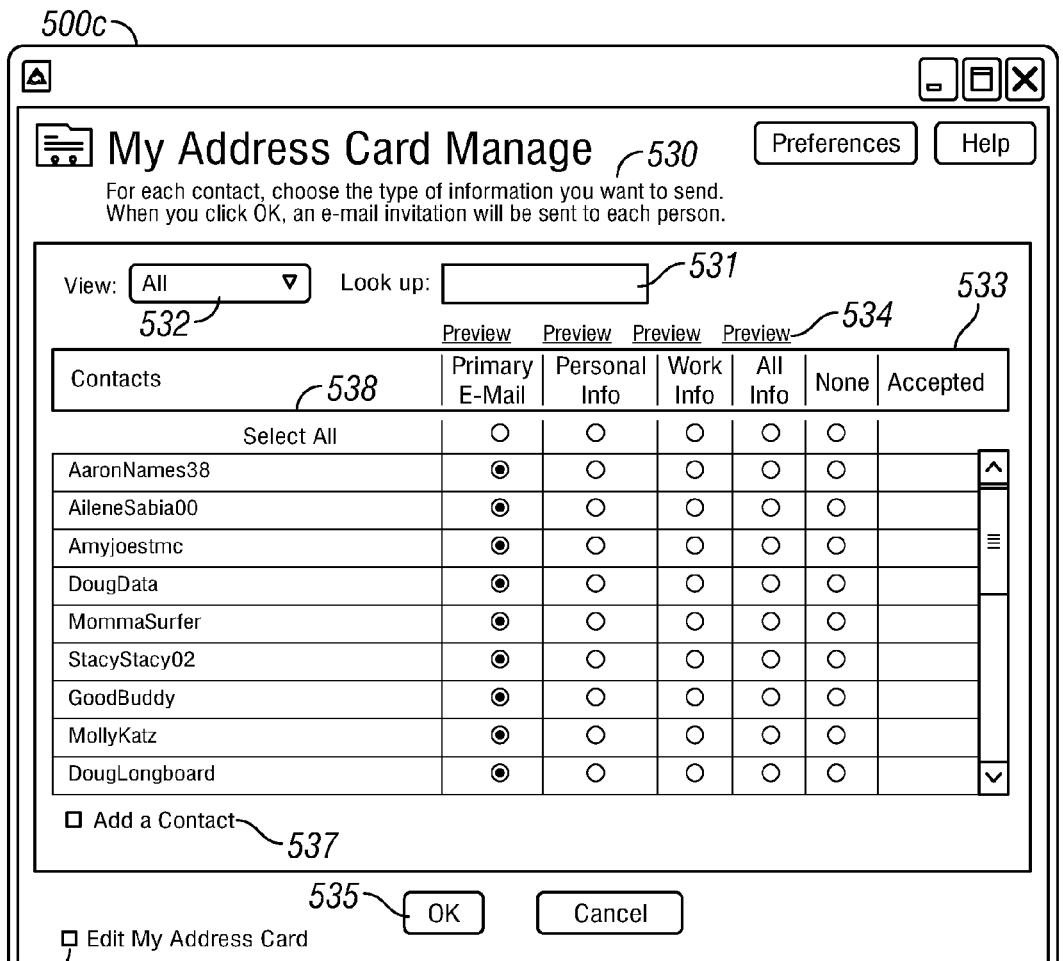
FIG. 5C is a schematic diagram showing a manage screen of the UI.

FIG. 5C is a schematic diagram showing the UI manage screen 500c. An informational text 530 is shown below "My address card—Manage", which communicates a message that all subscribers will receive updated information when the "Update" button in the update screen of FIG. 5F is clicked. The "Look Up" window 531 allows the user to find subscribers by name. The views dropdown menu 532 shows all category names from a current category list in the address book as shown in FIG. 5L. The drop down menu also includes a "default to all" option and follows address book defaults and hierarchy, for example: All→Co-workers, Family and Friends→Auto-added, Uncategorized→Manage. The "Column Headers" 533, such as Contacts, Primary e-mail, Personal Information, Work Information, All Information, None, Accepted, are used to set up specific views of the sharable address card. When a header is clicked, columns sort according to the criteria chosen. For example, when Primary E-mail header is clicked all those subscribers to Primary E-Mail information will shuffle to the top. Each of the preview links 534 invokes a view of that view-type, on top of, but offset to screen views shown in FIGS. 5D and 5E.

Figure 5D:
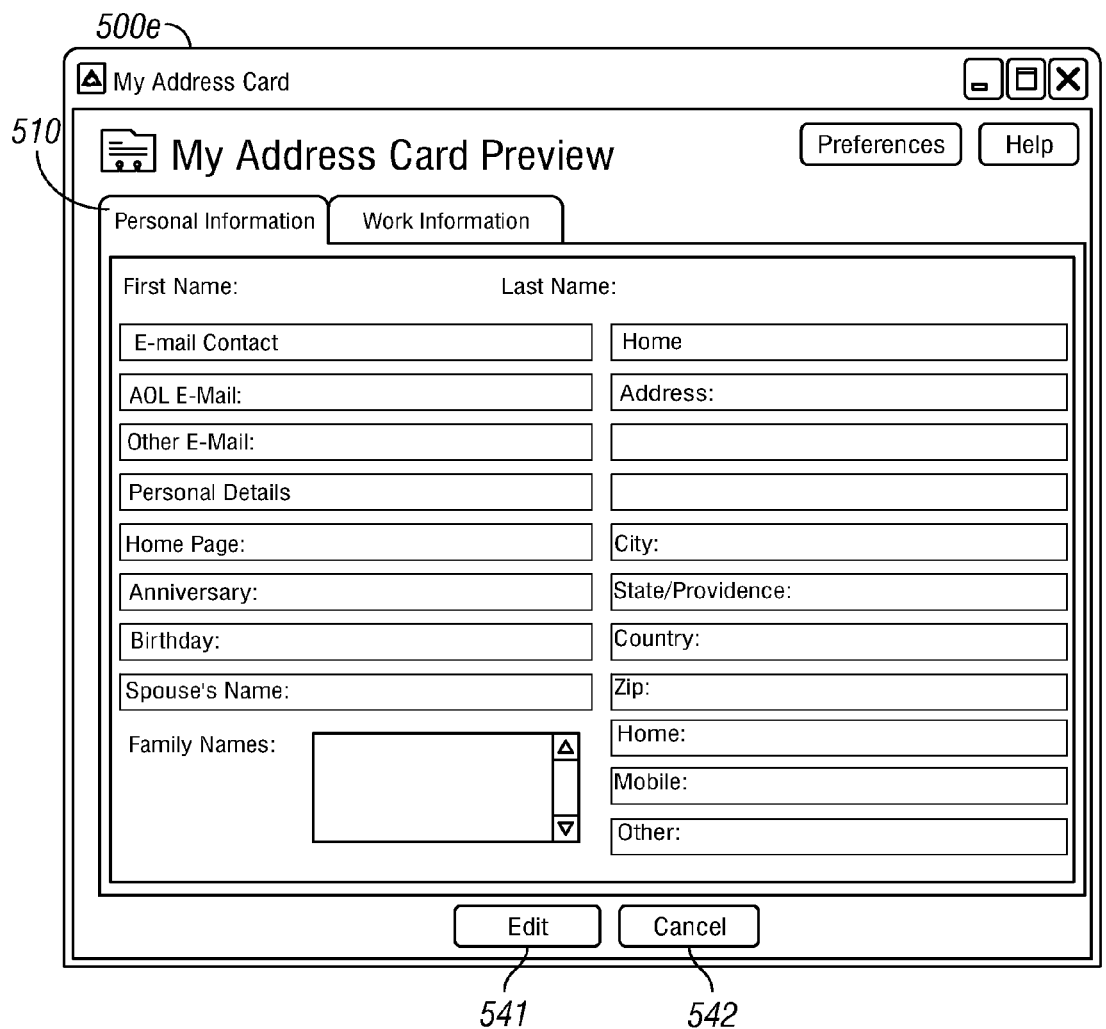
FIG. 5D is a schematic diagram showing an exemplary preview screen with the "Personal Information" tab at the front.
Figure 5E:
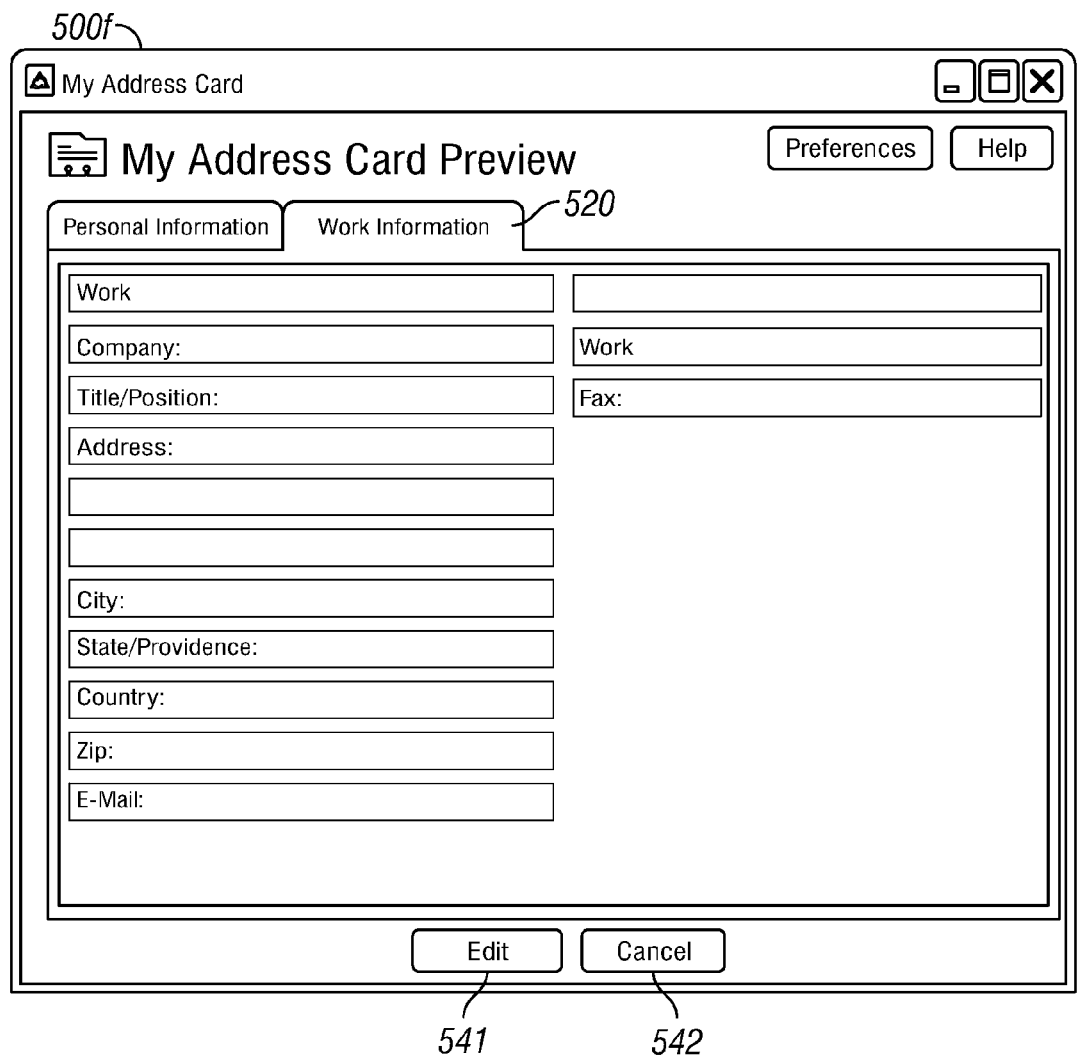
FIG. 5E is a schematic diagram showing an exemplary preview screen with the "Work Information" tab at the front.
Figure 5F:
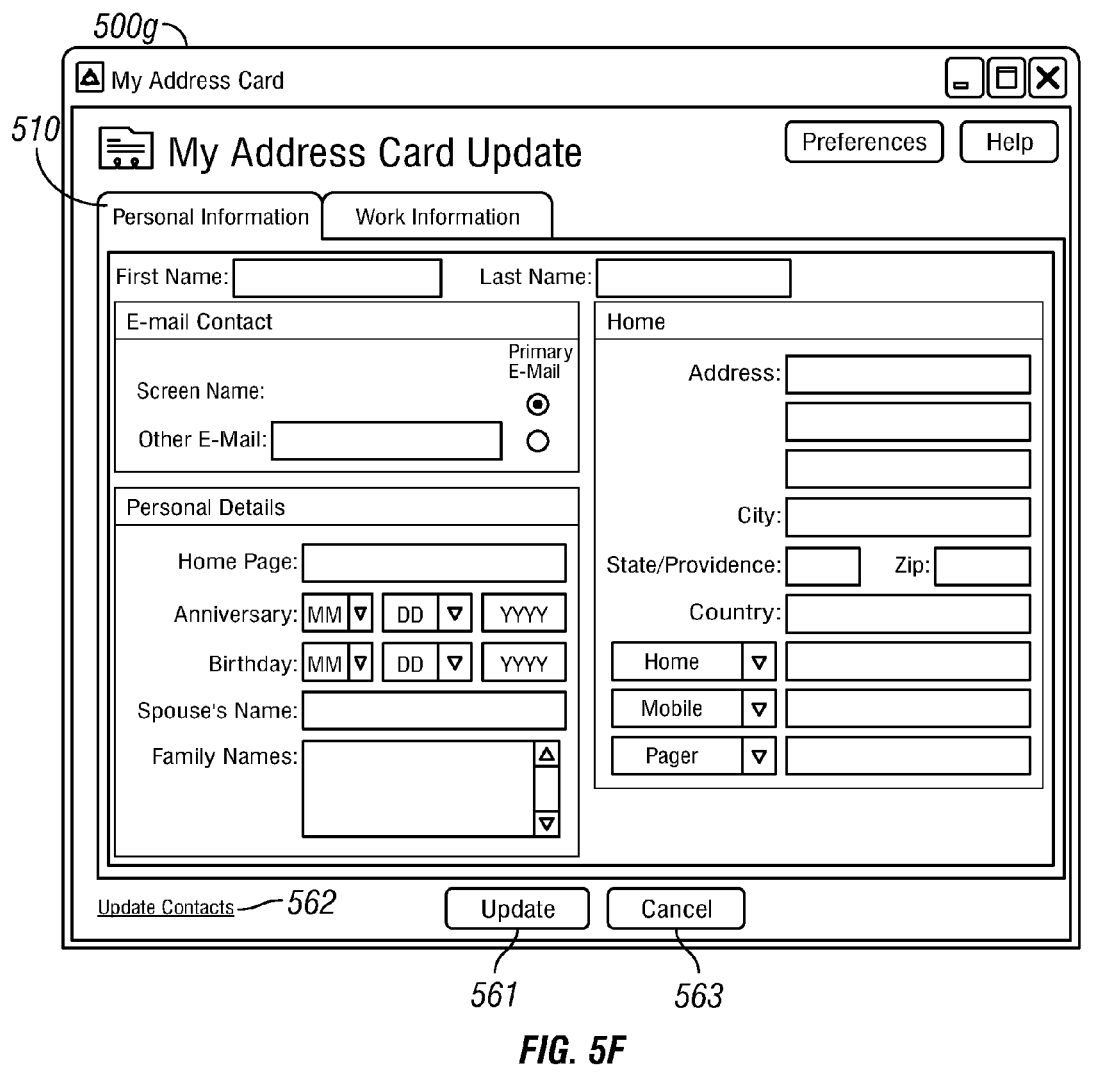

FIG. 5D is a schematic diagram showing an exemplary preview screen 500e with the "Personal Information" tab 510 at the front. FIG. 5E is a schematic diagram showing an exemplary preview screen 500f with the "Work Information" tab 520 at the front. In the preview screens, the previously entered information is static and uneditable. Note that preview of information depends on what privileges a member gives recipients of card. For example, the "All Info" view covers "E-mail contact", "Personal", "Work" and details; the "Work Info" view covers "E-mail contact" and work information; the "Personal Info" view covers "E-mail contact" and Home information and details; and the "Primary E-mail" view only covers username and e-mail address. By clicking the "Edit" button 541, the user is prompted to "My address card Update" (FIG. 5F and FIG. 5G) and the preview screen closes at the same time. Otherwise, by clicking the cancel button 542, the screen is closed.

Figure 5G:
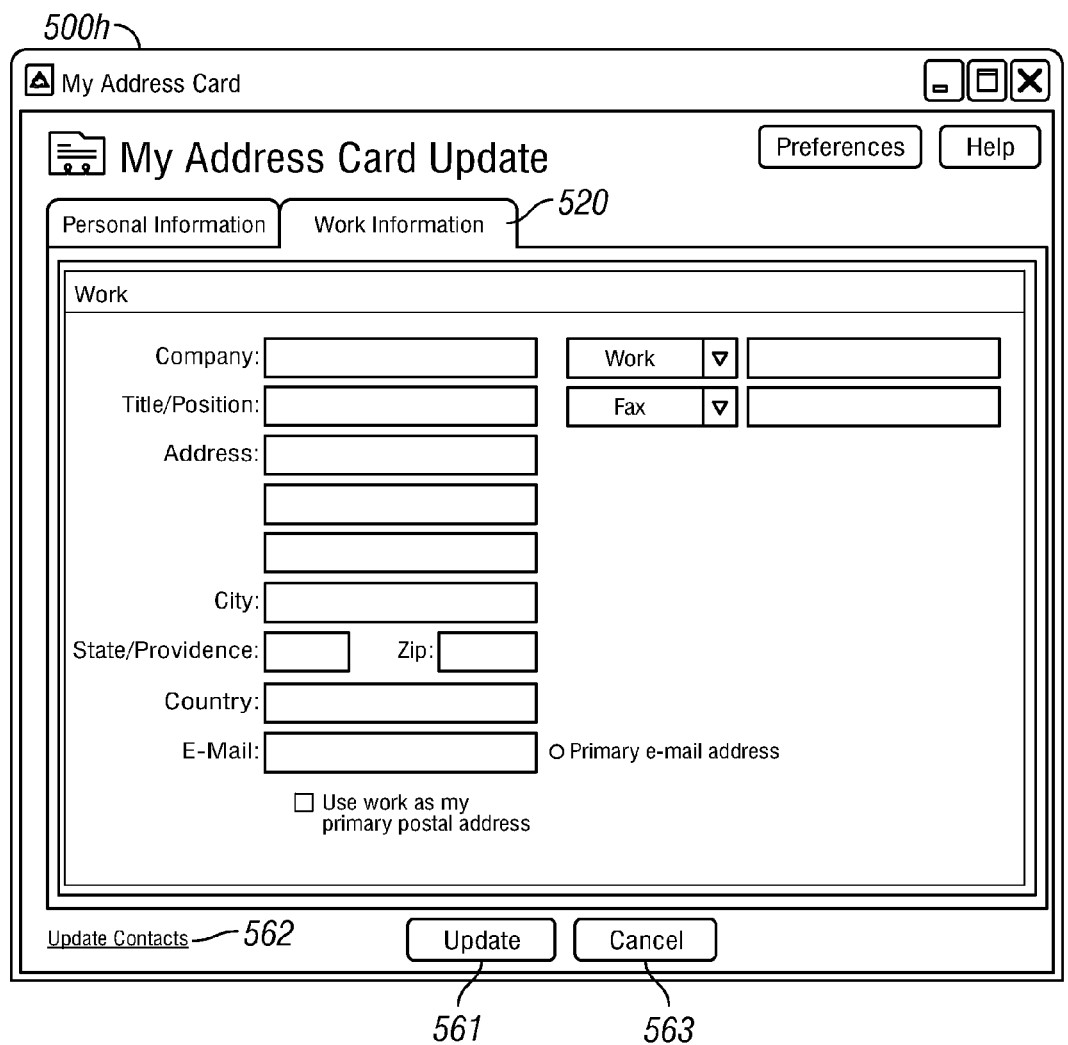
FIG. 5G is a schematic diagram showing an exemplary update screen with the "Work Information" tab at the front.
Figure 5H:
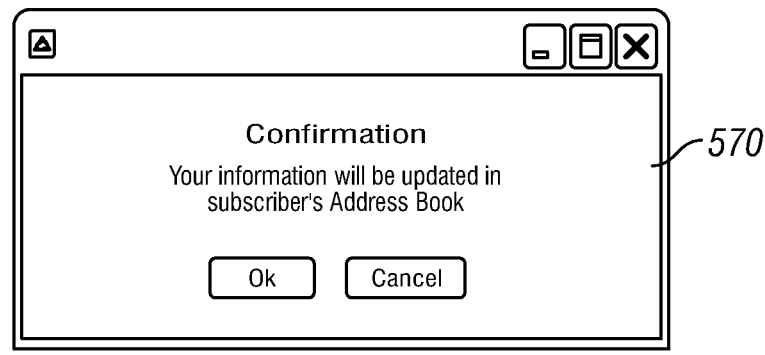
FIG. 5H is an exemplary update confirmation pop-up.

FIG. 5F is a schematic diagram showing an exemplary update screen 500g with the "Personal Information" tab 510 at the front. FIG. 5G is a schematic diagram showing an exemplary update screen 500h with the "Work Information" tab 520 at the front. After editing the information in the cards, the user clicks the "Update" button 561 whereby he is prompted to a confirmation card as shown in FIG. 5H. By clicking the "Update Contacts" link 562, the user returns to the manage screen of FIG. 5C. Otherwise, by clicking the cancel button 563, the update screen is closed and no edits or updates are accepted.

Figure 6A:
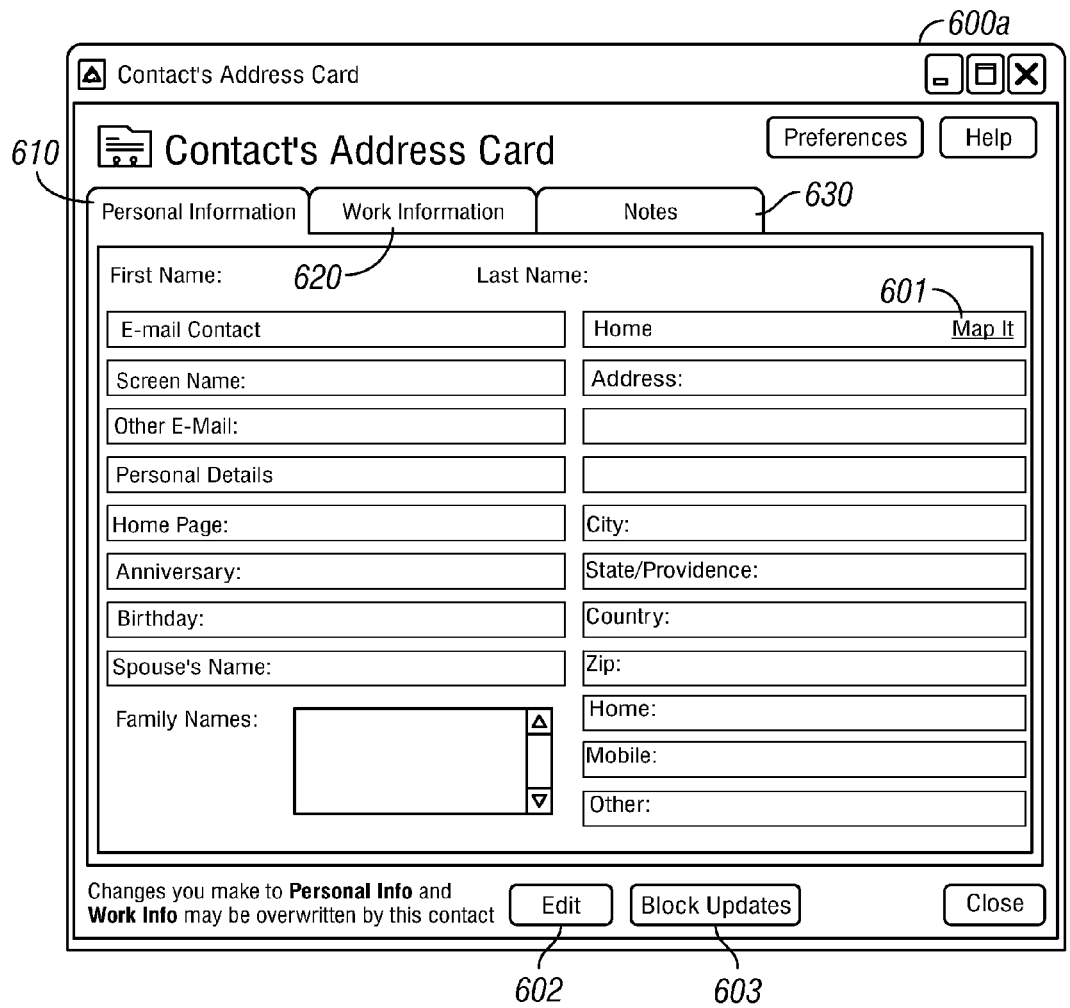
FIG. 6A is an exemplary screen for member receive with the "Personal Information" tab at the front.

Now referring back to FIG. 5O, the manage screen 500c, where the "Edit My address card" link 536 takes the user to the update screens as shown in FIG. 5F and FIG. 5G. By clicking the "Add a Contact" link 537, the user is returned a screen for adding a new contact to the address book as shown in FIG. 6A. The "Select All" button 538 enables the user to check the entire row by a single click.

Figure 5I:
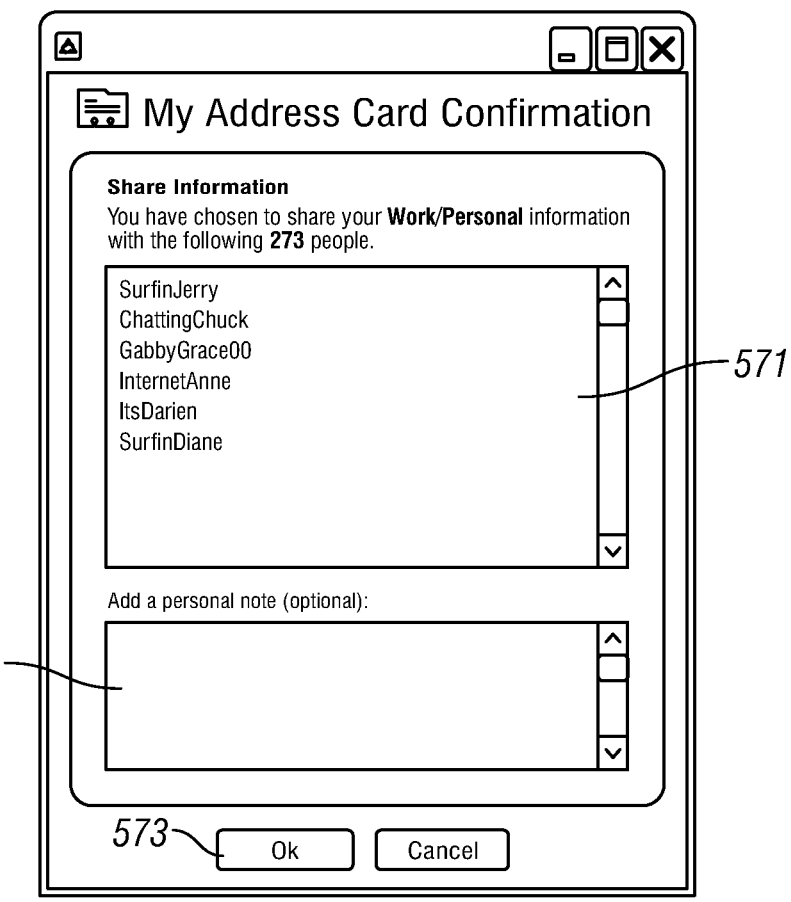
FIG. 5I is an exemplary share confirmation pop-up.

The "OK" button 535 in FIG. 5C takes the user to a confirmation card with different appearances depending on the settings. For "send only", the "OK" button 535 takes the user to a confirmation-send card as shown in FIG. 5I, which includes the names from the manage screen of FIG. 5C that this address card will be sent to. In FIG. 5I, the user cannot act on names in the name list. By clicking the "OK" button 573, the address card is sent to the designated recipients via pre-populated e-mail. If the personal note field 572 is filled out, the information therein is sent to the recipients at the same time.

Figure 5J:
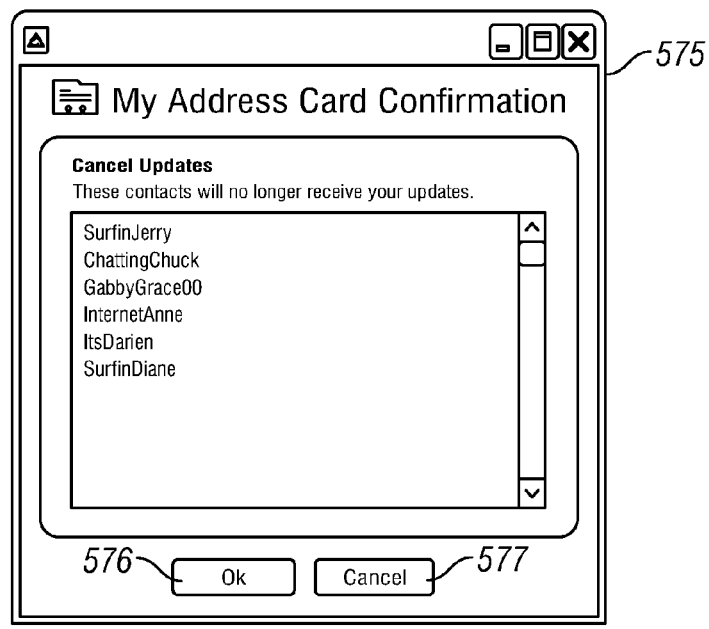
FIG. 5J is an exemplary cancel update pop-up.

Still in FIG. 5C, the "OK" button 535 may take the user to a confirmation-cancel updates tab 575 as shown in FIG. 5J, which includes the names from the manage screen of FIG. 5O that this address card will stop sending updates to. In FIG. 5J, the user cannot act on the names in the list. Clicking on the "OK" button 576 breaks the link to the named subscribers and closes the screen. If this is the user's first time sending an address card, then a preferences screen as shown in FIG. 6H is invoked. The "OK" button 576 closes the manage screen of FIG. 5C as well. The "Cancel" button 577 closes the screen 575 and returns the user to the manage screen 500c of FIG. 5O, and thus no subscriptions are cancelled.

Figure 5K:
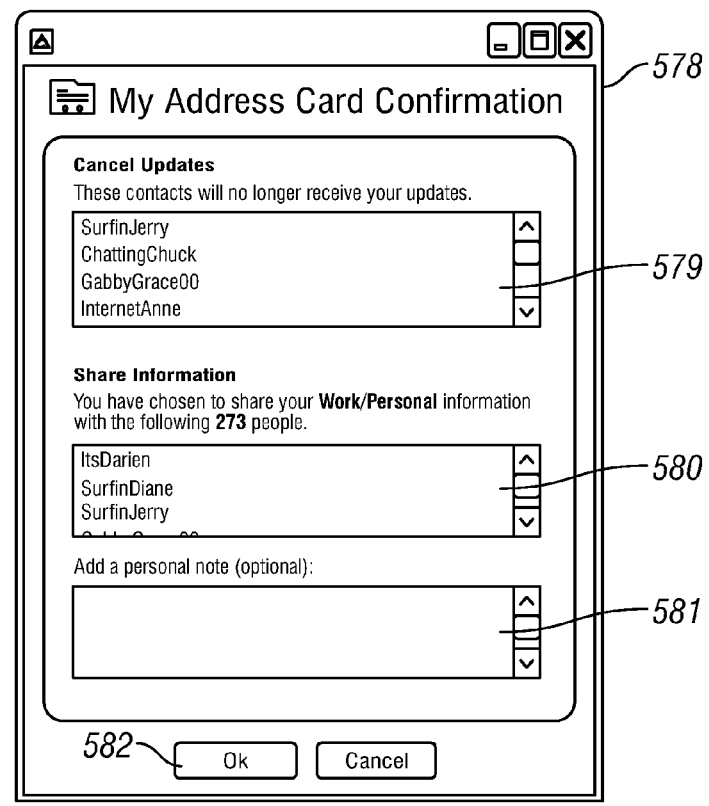
FIG. 5K is an exemplary extended cancel/share update confirmation pop-up.
Figure 5L:
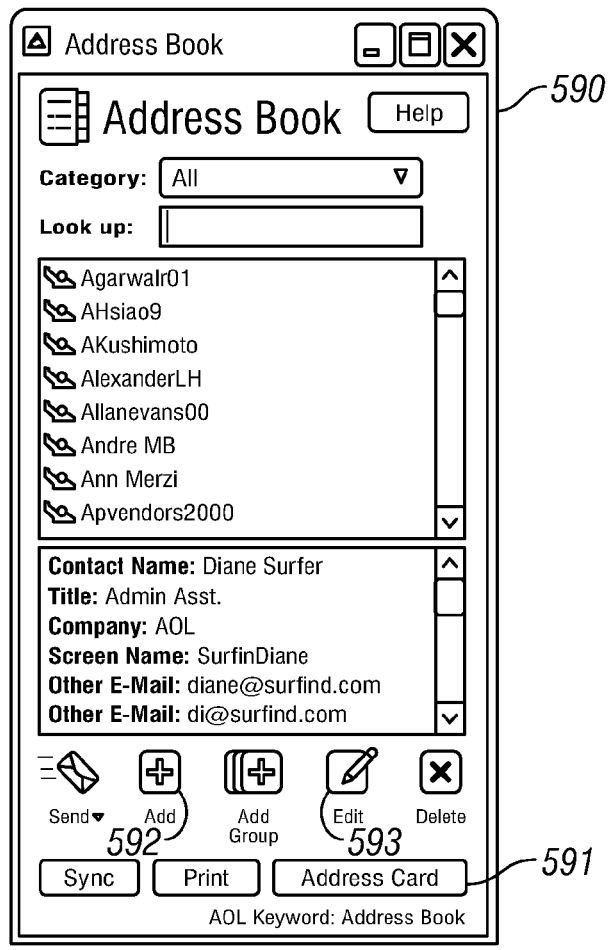
FIG. 5L is an exemplary address book linked to address card.

The "OK" button 535 in FIG. 5C may take the user to an extended confirmation-cancel updates screen 578 as shown in FIG. 5K, which is a combination of the cards of FIG. 5I and FIG. 5J. The card includes a cancel list box 579 and a send (share) box 580. The cancel list 579 contains the names from the manage screen in FIG. 5C that this address card will stop sending updates. The send list box 580 contains the names from the manage screen in FIG. 5C that this address card will be sent to. The names box 579 and box 580 are not editable, i.e. the user cannot act on them. When the "OK" button 582 is clicked, the address card is sent to the designated recipients via pre-populated e-mail. If the personal note field 581 is filled out, the entered data is also sent to the recipients. If this is the user's first time sending an address card, then a preferences screen as shown in FIG. 6H is invoked.

Figure 5M:
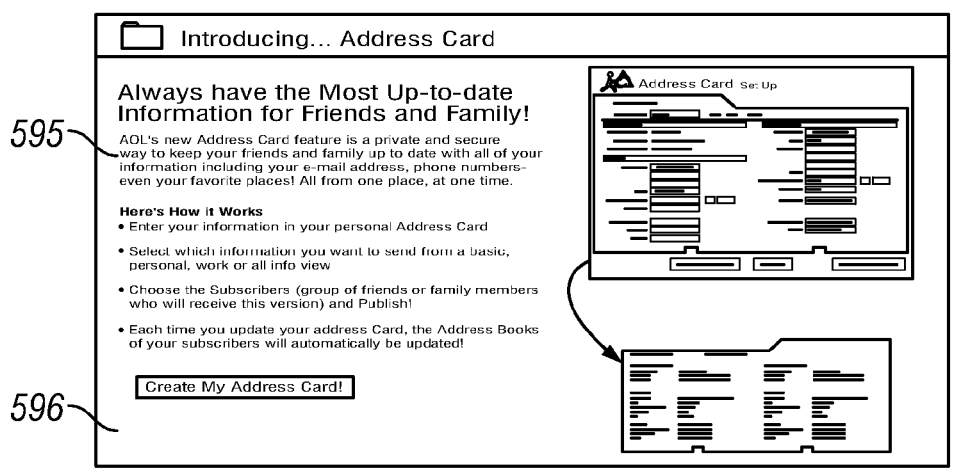
FIG. 5M is an exemplary introduction pop-up.

The address card is incorporated into an existing address book scheme. FIG. 5L is a schematic diagram showing the address book screen 590 with an address card button 591. If the user does not have an address card set up, the button 591 takes the user to the introduction screen 595 as shown in FIG. 5M. The screen 595 provides a link 596 for creating "My address card".

Figure 6B:
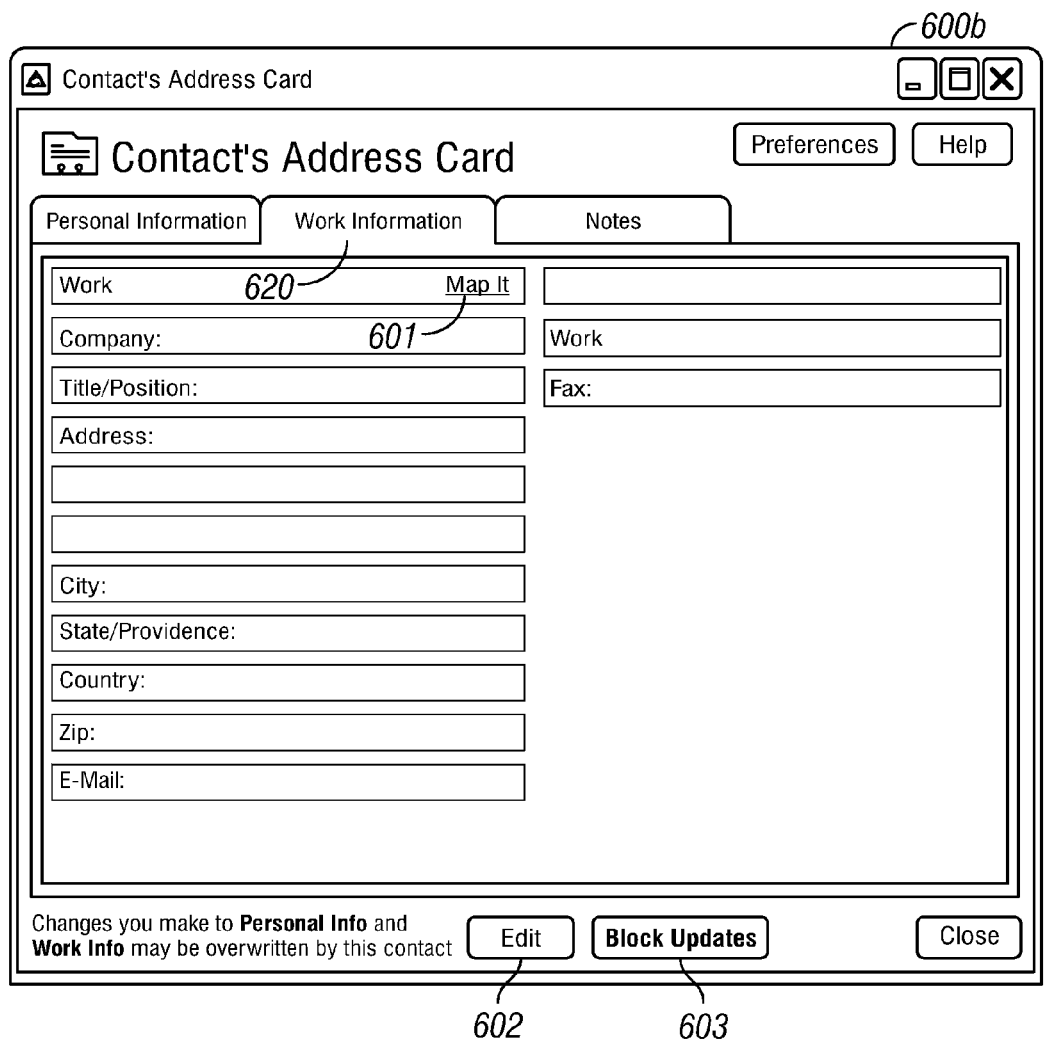
FIG. 6B is an exemplary screen for member receive with the "Work Information" tab at the front.
Figure 6C:
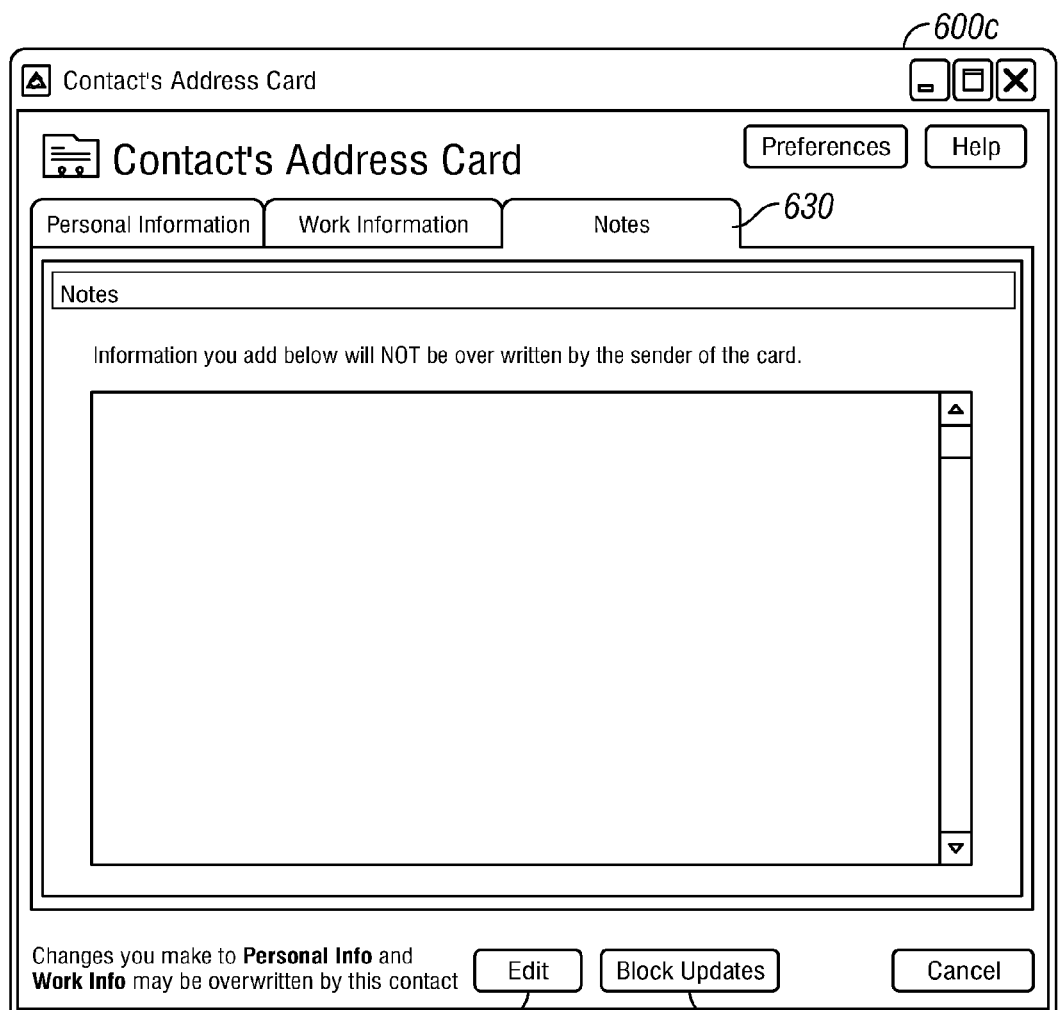
FIG. 6C is an exemplary screen for member receive with the "Notes" tab at the front.
Figures 6D, 6E:
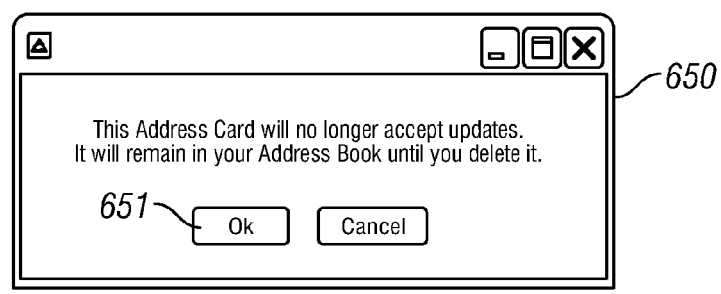
FIG. 6D is an exemplary editable receive screen with the "Personal Information" at the front.
FIG. 6E is an exemplary "Unsubscribe Confirmation" pop-up.

FIGS. 6A, 6B and 6C are schematic diagrams showing screens of a sender's address card received by a user. FIG. 6A is a screen for member receive 600a with the personal information tab 610 at the front. FIG. 6B is a screen for member receive 600b with the work information tab 620 at the front. FIG. 6C is a screen for member receive 600c with the notes tab 630 at the front. The personal information tab 610 and the work information tab 620 also include a "Map It" link 601, which takes the user to a map request for location and/or driving directions. The "Edit" button 602 in FIG. 6A invokes an editable receive screen 600d as shown in FIG. 6D. Similarly, the "Edit" button 602 in FIG. 6B and FIG. 6C invokes an editable work information receive screen and an editable note screen respectively. The "Block Updates" button 603 in FIGS. 6A, 6B and 6C invokes an "Unsubscribe Confirmation" tab 650 as shown in FIG. 6E. The "OK" button 651 blocks further updates to this address card.

Figure 6F:
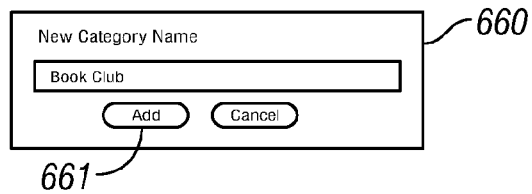
FIG. 6F is an exemplary pop-up for saving the address card to a new category.
Figure 6G:
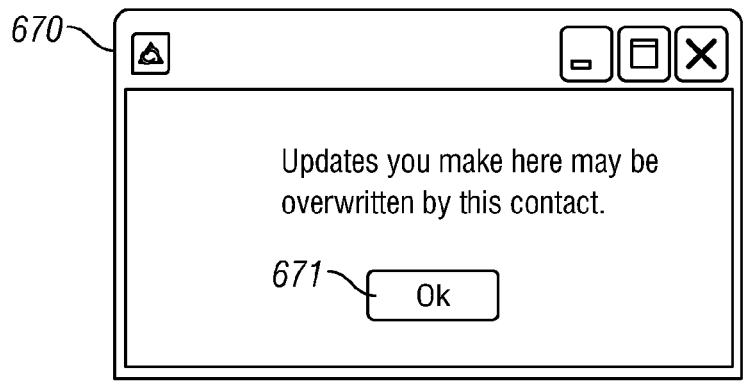
FIG. 6G is an exemplary pop-up for overwriting confirmation.
Figure 6H:
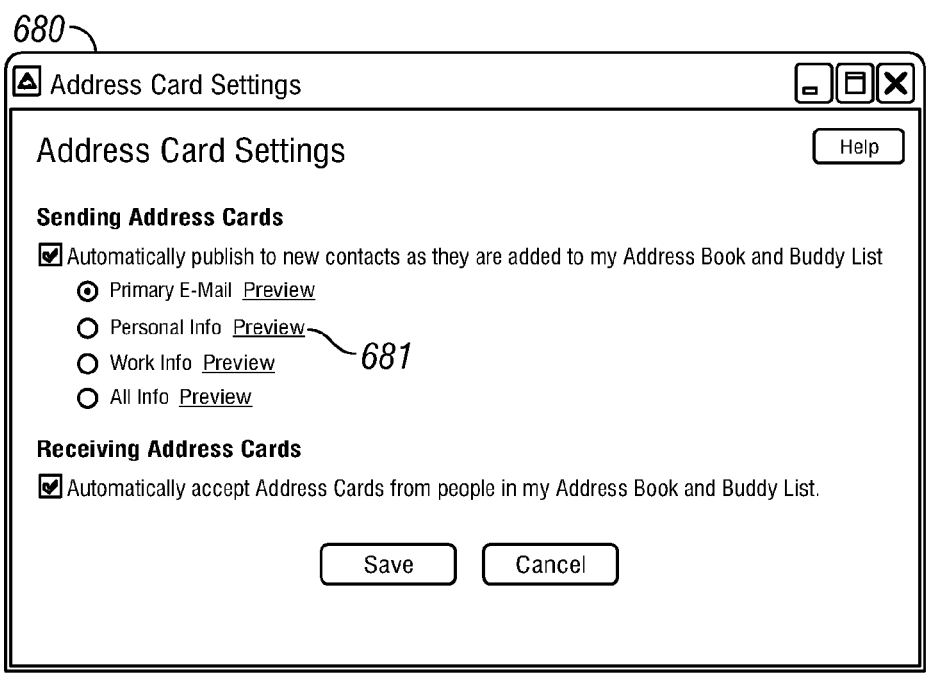
FIG. 6H is an exemplary pop-up for address card preferences settings.

Referring to FIG. 6D, where the category dropdown 641 shows all categories that this address card is saved hereunder. If the user chooses to add the saved card to a new category, he is returned a small tab 660 as shown in FIG. 6F. The "Add" button 661 adds a new category name and puts the new category at the top of the drop down list. The "Save" button 642 in FIG. 6D saves all information and takes the user to an over write confirmation screen 670 as shown in FIG. 6G. The "OK" button 671 accepts all changes made by the user and closes the screen.

FIG. 6H is a schematic diagram showing a preferences screen 680, which is part of the address card settings. Note that the preview link 681 invokes the preview of the address card as shown in FIG. 5D.

Figure 7A:
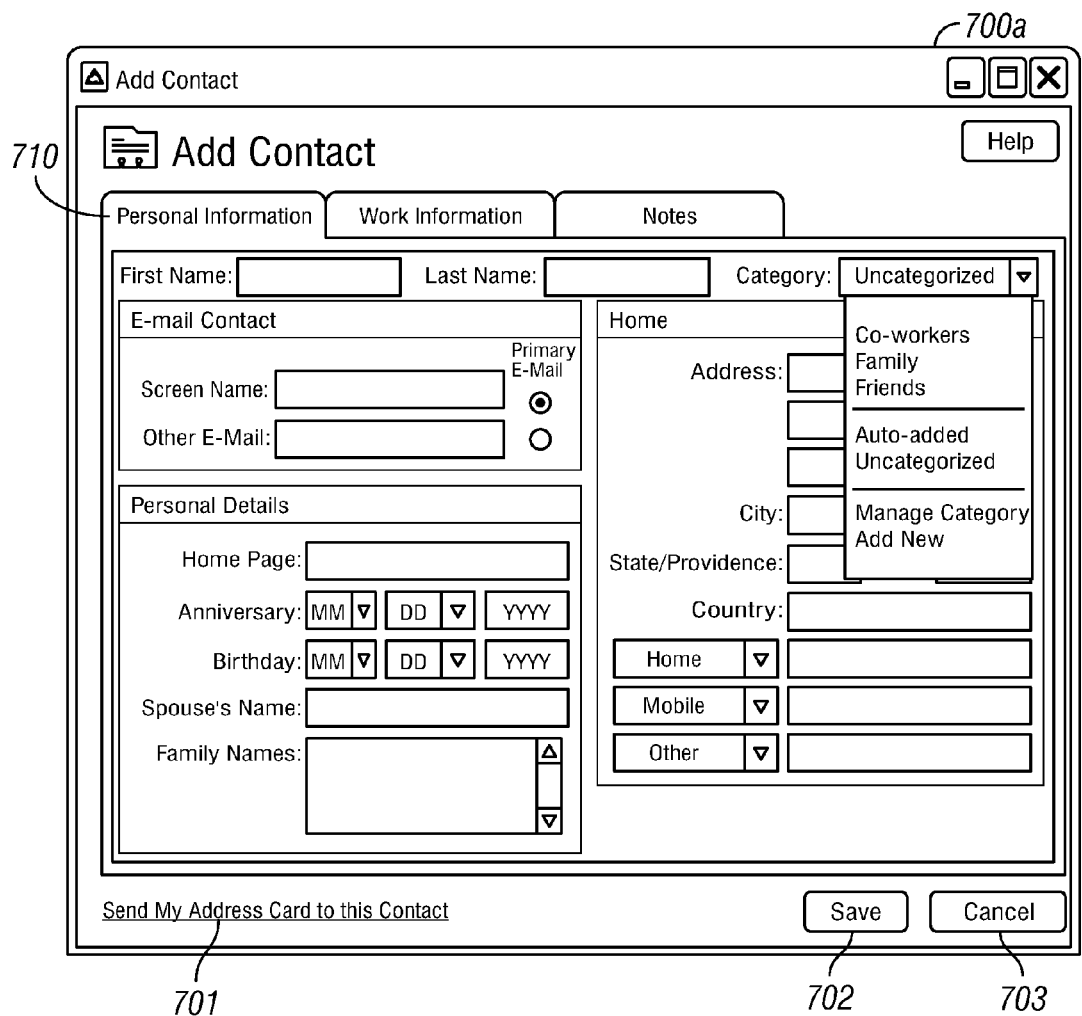
FIG. 7A is an exemplary add contact screen with the "Personal Information" tab at the front.
Figure 7B:
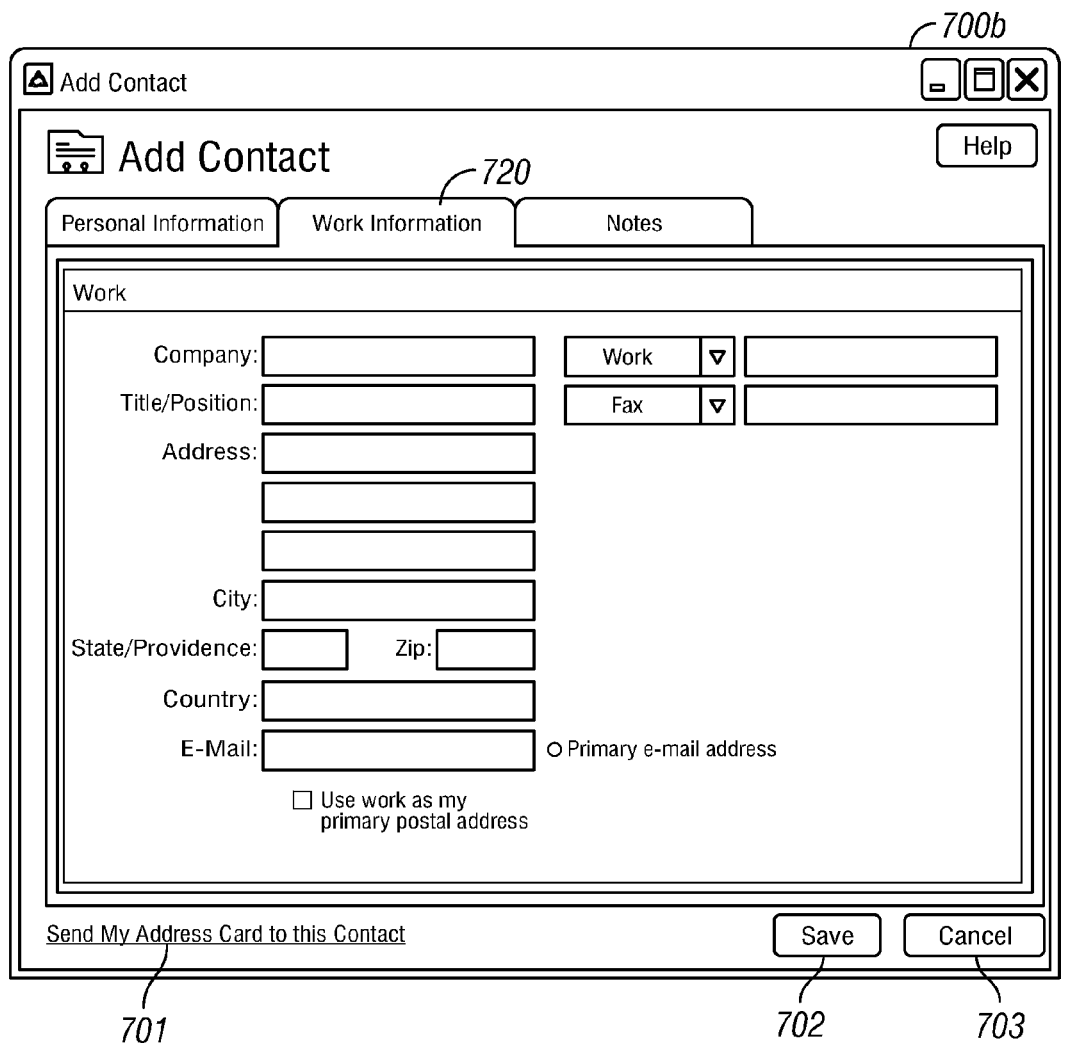
FIG. 7B is an exemplary add contact screen with the "Work Information" tab at the front.

Now referring back to FIG. 5L, if a user has already set up his address card, the user can get to the "Add a Contact" screen either by clicking the "Add" button 592, or by clicking the "address card" button 591 which takes him to the manage screen in FIG. 5C, where he can select the "Add a Contact" 515. Either way, the user is returned a screen 700a, as shown in FIG. 7A, for adding a new contact's information. The contact's personal information is added into the "Personal Information" card 710. The contact's "Work Information" is added when the corresponding "Work Information" card 720 is brought to the front of screen 700b as shown in FIG. 7B. The contact's "Notes" is added when the corresponding "Notes" card 730 is brought to the front of screen 700c as shown in FIG. 7C.

Figure 7C:
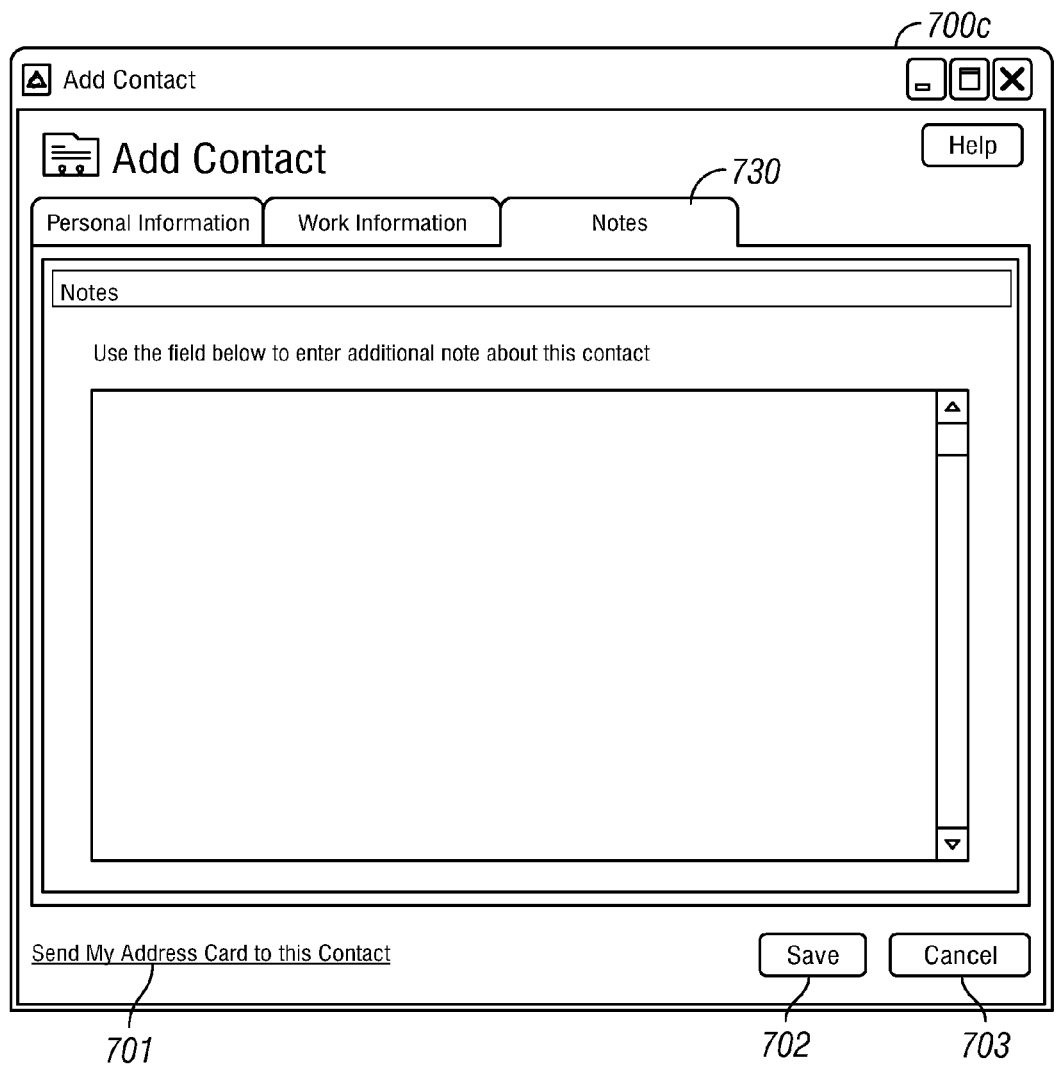
FIG. 7C is an exemplary add contact screen with the "Notes" tab at the front.
Figure 7D:
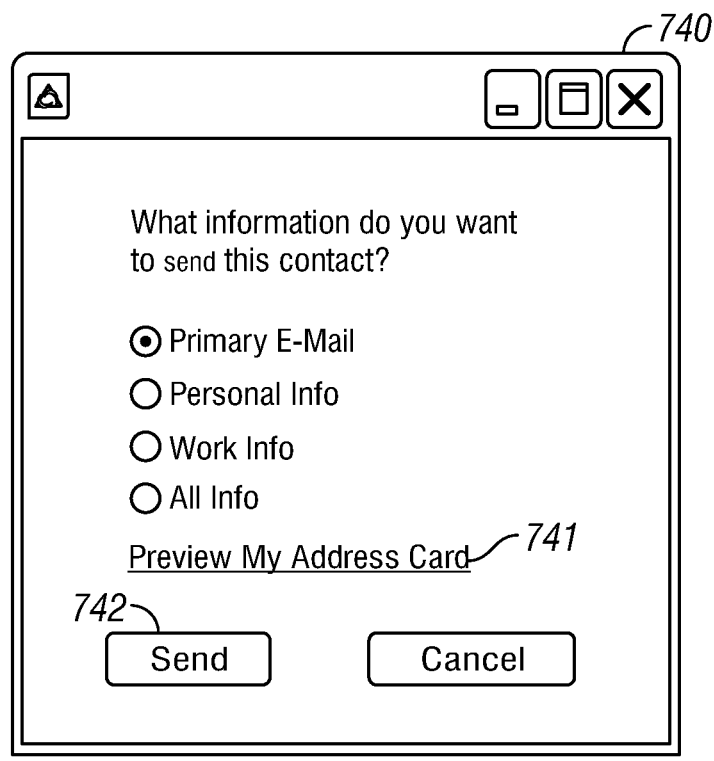
FIG. 7D is an exemplary pop-up for setting view levels.

In the screens 700a-700c, the hyperlink "Send My address card to this Contact" 701 takes the user to a "What Info do You Want to Share" screen 740 as shown in FIG. 7D. The hyperlink 701 only appears after the user has entered either a Screen Name or E-mail address and clicked "Save" button 702, which takes the user back to the address book as shown in FIG. 5L. In FIG. 7D, the default is always the same as the level of information being received. For example, if the user A shares "Work Information" with user B, the default for this screen is the "Work Information". The preview link 741 opens the view screen 600a as shown in FIG. 6A.

Figure 7E:
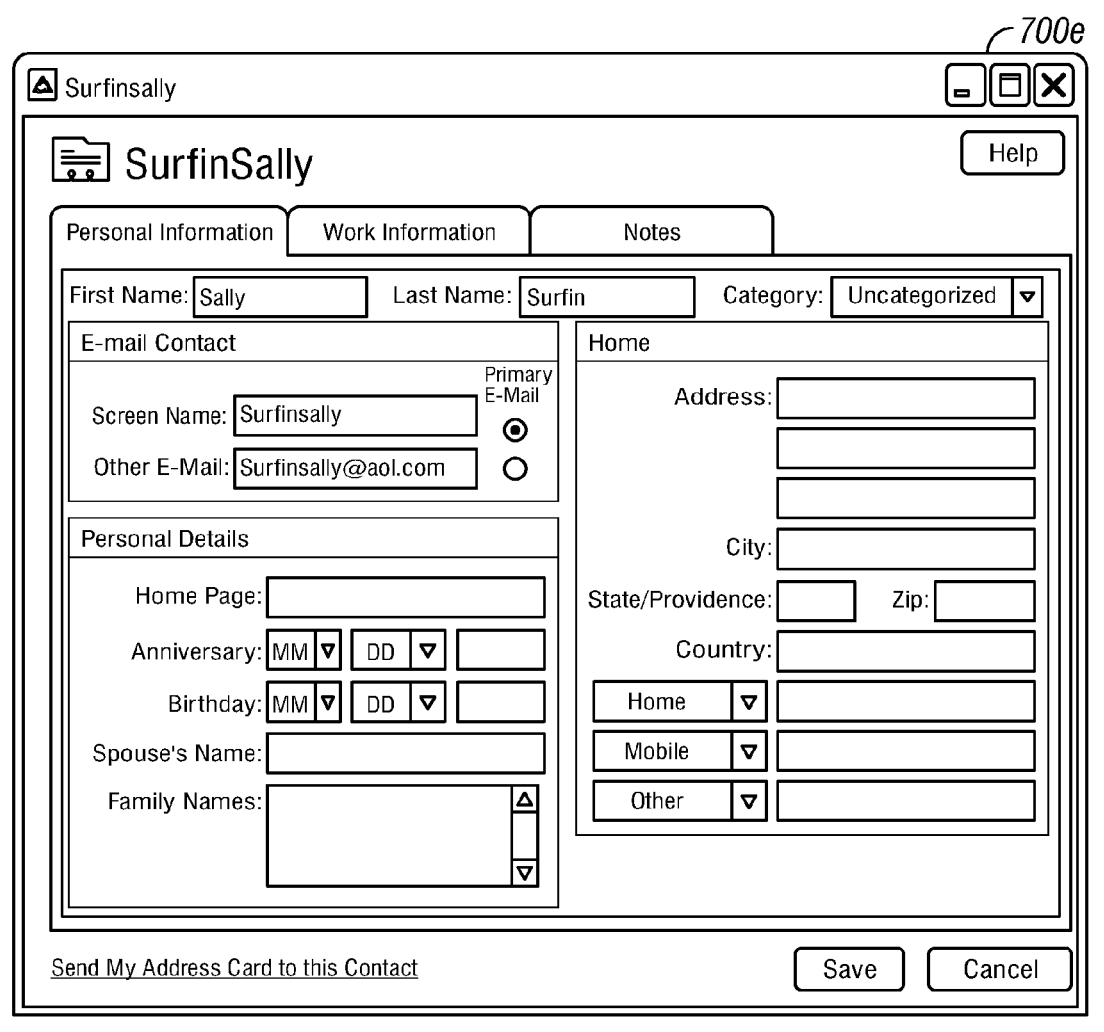
Figure 7F:
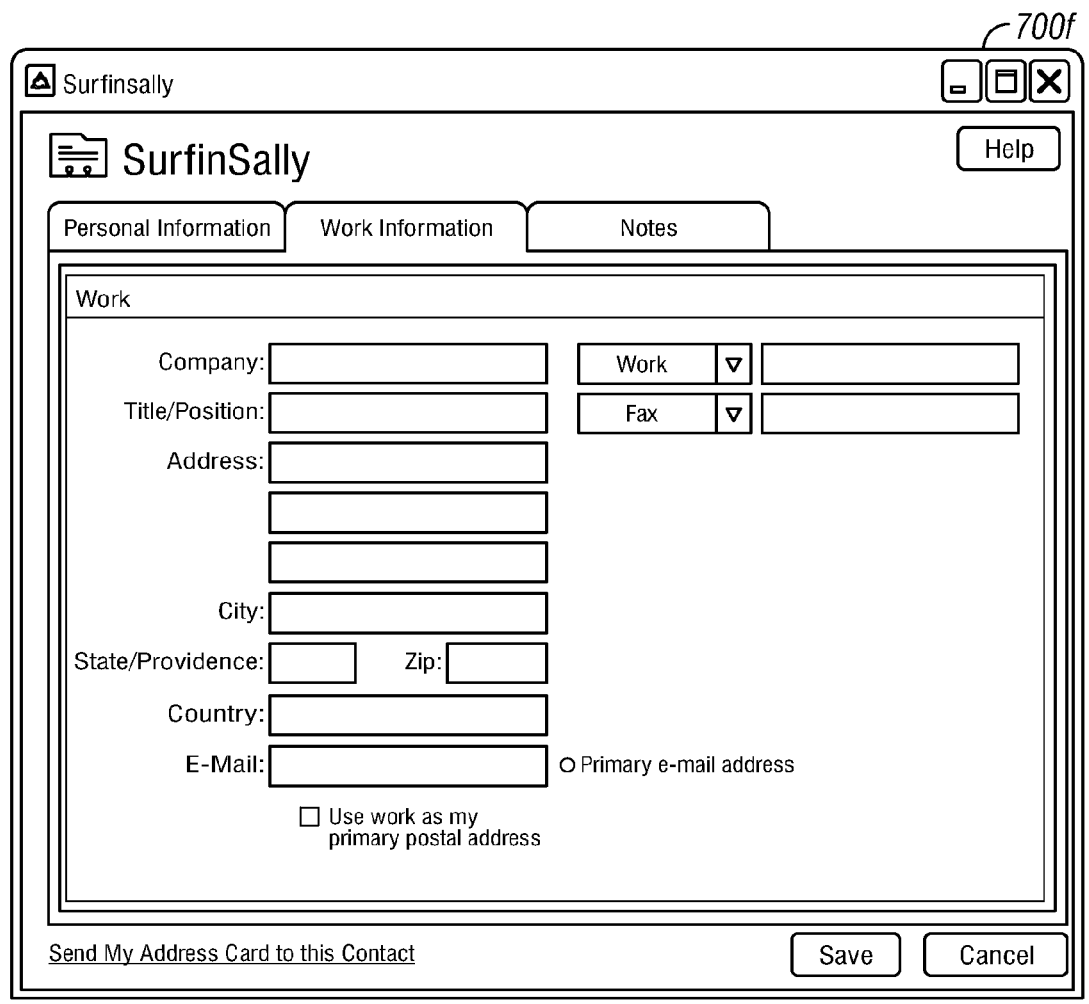
FIG. 7F is an exemplary edit contact screen with the "Work Information" tab at the front.
Figure 7G:
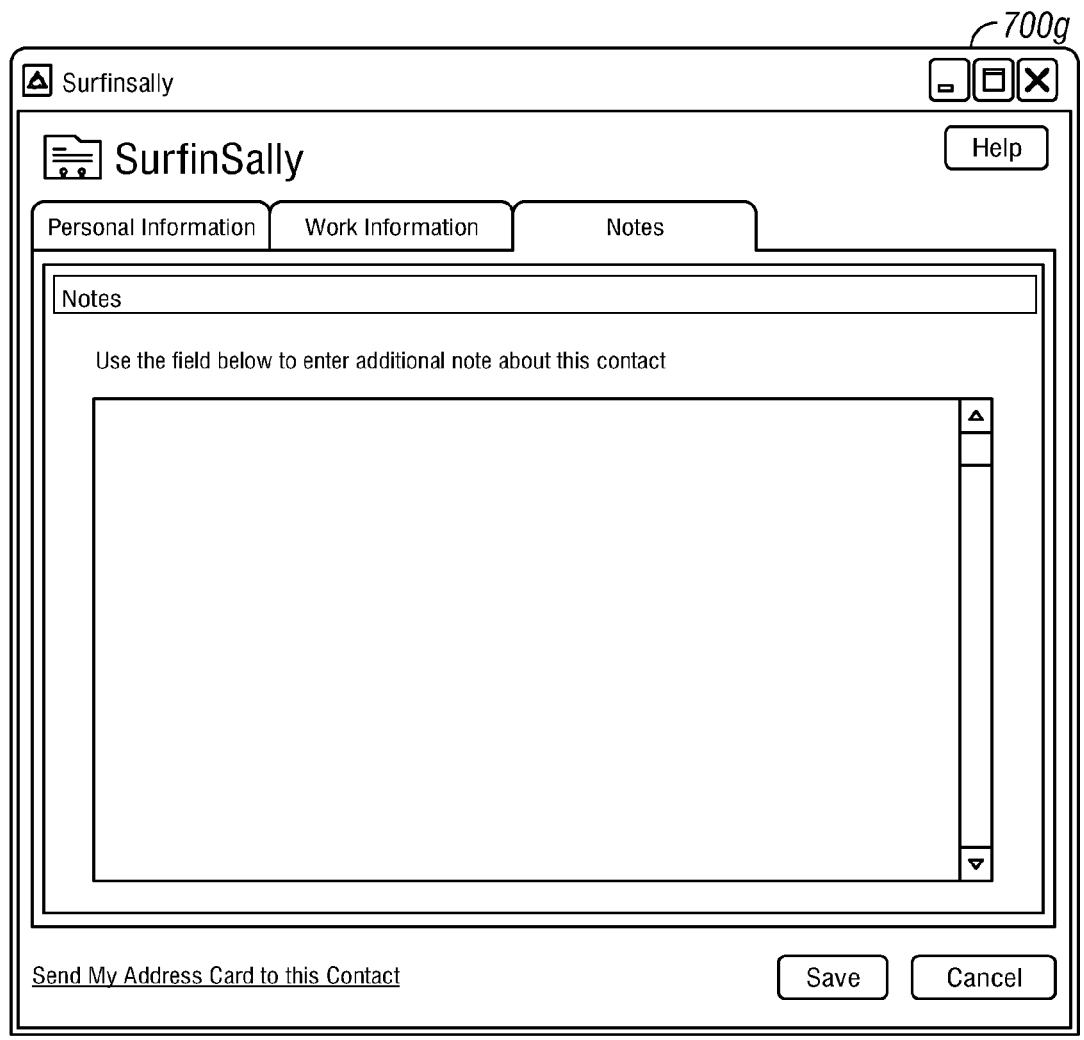
FIG. 7G is an exemplary edit contact screen with the "Notes" tab at the front.

Now referring back to FIG. 5L again, where the user highlights a screen name and then clicks the "Edit" button 593, which takes the user to the updating screen as shown in FIGS. 7E, 7F and 7G. The buttons and hyperlink have the same function as those in FIGS. 7A, 7B and 7C.

Figure 8A:
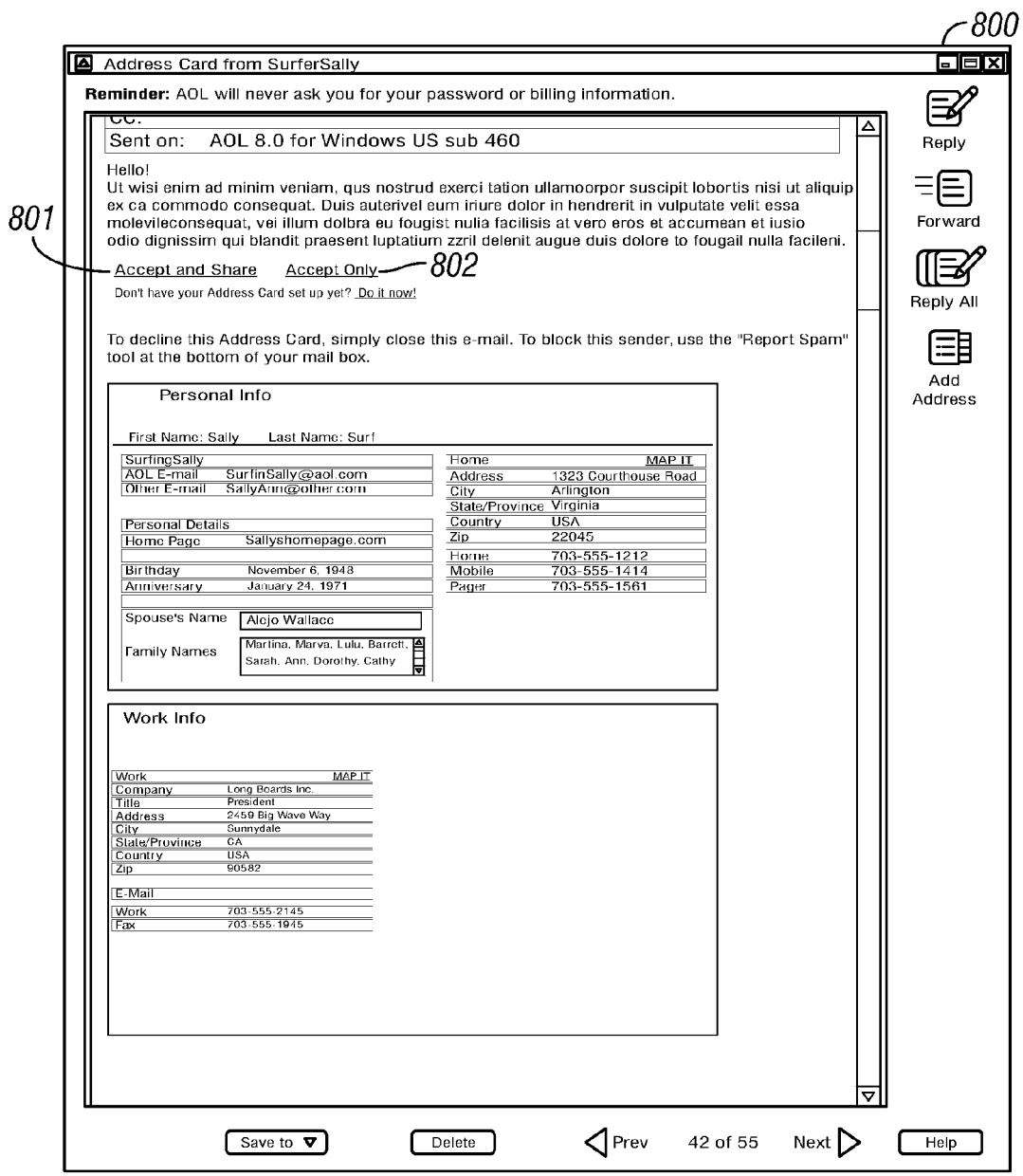
FIG. 8A is a schematic screen showing an exemplary address card received in e-mail by a member which was sent by the sender of the address card illustrated in FIGS. 7A-7D.
Figure 8B:
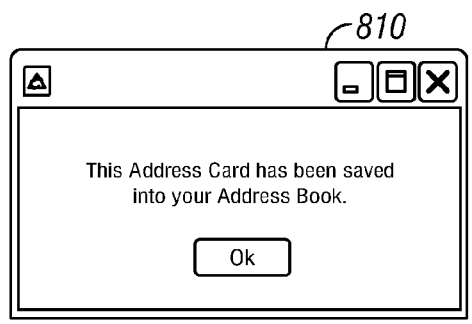
FIG. 8B is an exemplary receive accept pop-up.

FIG. 8A is a schematic screen showing an exemplary address card received in e-mail by a member which was sent by the sender of the address card illustrated in FIGS. 7A, 7B and 7C. The screen 800 includes a hyperlink 801 which invokes the "What Information do You Want to Share" screen 740 as shown in FIG. 7D. The screen also includes a hyperlink 802 which invokes the "address card Added to address book" tab 810 as shown in FIG. 8B.

Figure 9A:
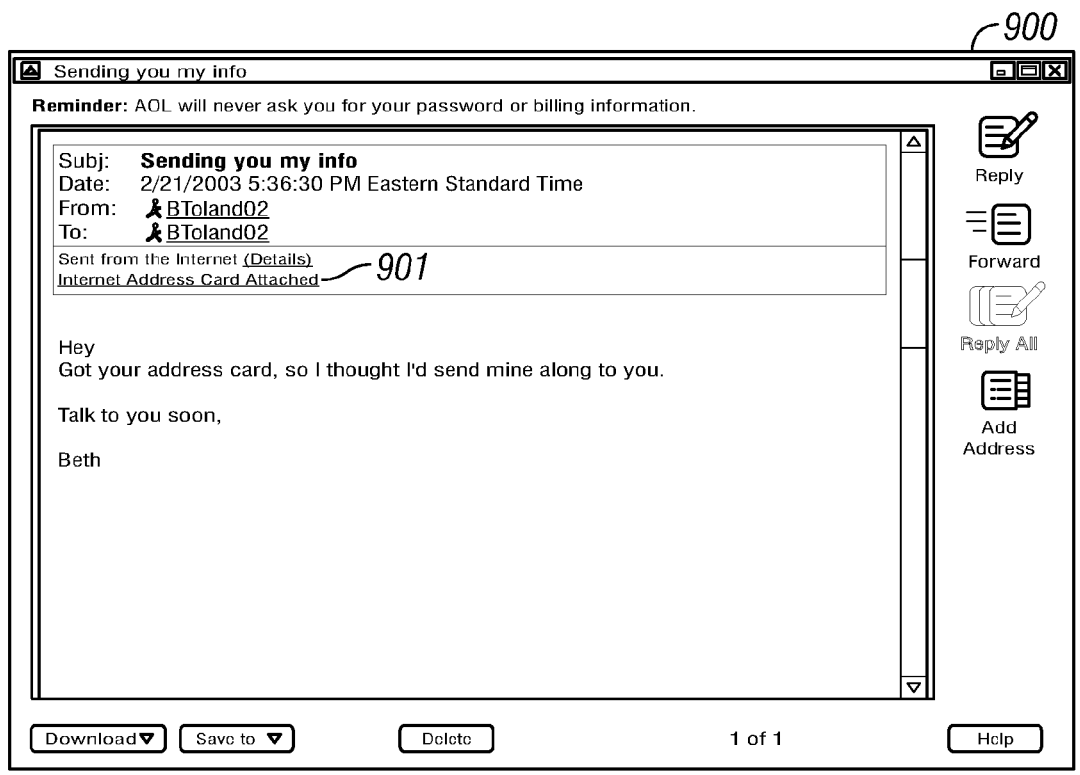
FIG. 9A is an exemplary e-mail receive screen with "Internet address card(s)" attachment link.
Figure 9B:
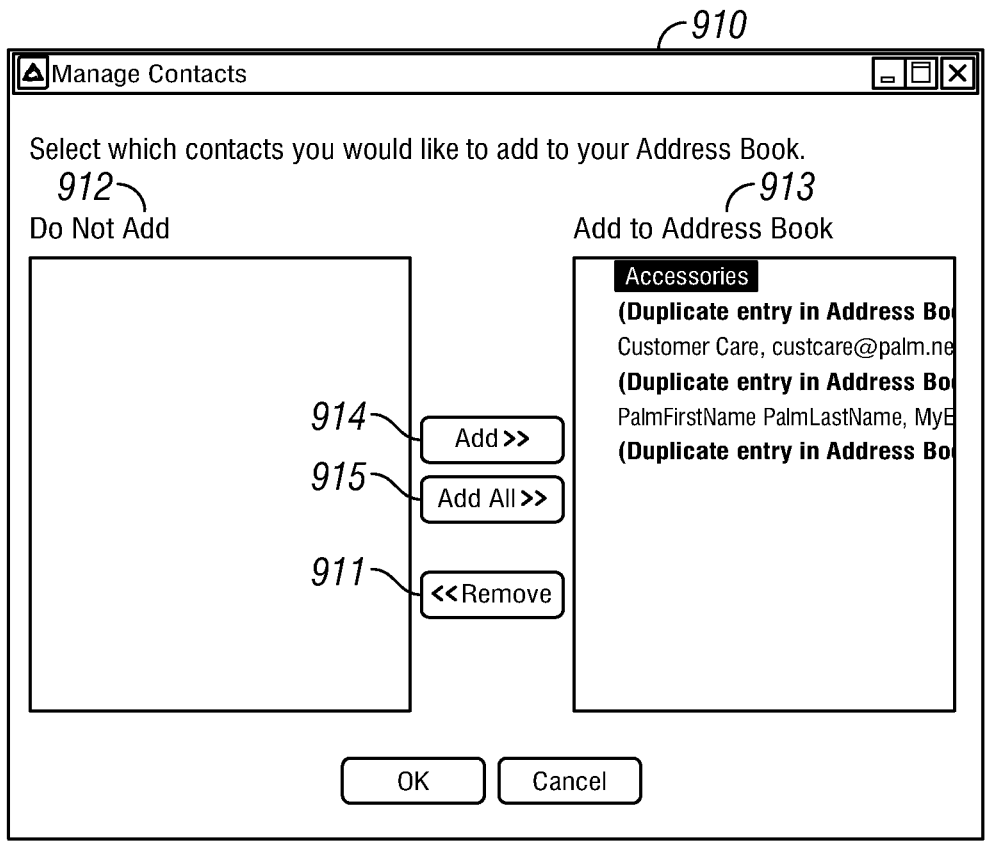
FIG. 9B is an exemplary option screen for the e-mail recipient to select the contacts he wants to add to his address book.

When the recipient of the e-mail screen 800 clicks the "accept and share" link 801, and, if he chooses to share his "Personal Information" or "Work Information" and clicks "Send" button 742, the sender of the e-mail screen 800 (i.e. the publisher who sends his address card initially) will receive an e-mail as illustrated in FIG. 9A. The e-mail screen 900 includes an "Internet address card(s)" attachment link 901, which invokes an option screen 910 as shown in FIG. 9B for the e-mail recipient to select the contacts he wants to add to his address book. If only one address card is attached, when the link 901 is clicked, the attached card is automatically added to the recipient's address book and a non-editable receive view is invoked.

Figure 9C:
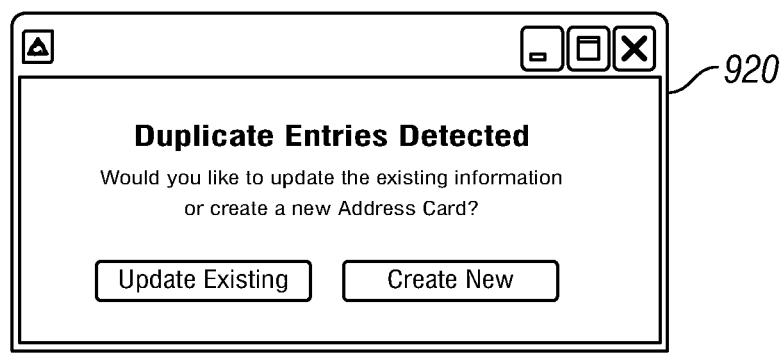
FIG. 9C is an exemplary pop-up for deleting a duplicate entry.

Now referring to FIG. 9B, the "Remove" button 911 removes the highlighted name from "Add to address book" list 912 and puts it back into the "Do Not Add" list 913. The "Add" button 914 adds the highlighted name to the list 912. The "Add All" button 915 adds all names in the list 913 to the list 912. If a duplicate entry is detected then a "Duplicate Message" pop-up 920 is invoked as shown in FIG. 9C, whereby the user can choose to update the existing information or create a new address card.

TERMINOLOGY

Address book—a host-based data base associated with a registered user's account in a Web service, containing the data, such as the names and e-mail addresses, of the user's contacts.

Member—a registered user who has an account with a Web service.

"My Community"—A group of peer members of a Web service associated with a publishing member based on a publishing-subscribing relationship. "My Community" can be represented by an icon, a hyperlink, a folder or what ever wherein the community members are further organized into different groups based on categorized sharing relationships.

Member of "My Community"/community member—a registered user who has been designated by another registered user as a member of the latter's "My Community". The former is called "subscriber" and the latter is called publisher because the former subscribes one or more digital resources from the latter based on predefined sharing relationships. Both the subscriber and the publisher, in most circumstances, are registered users of the same Web service.

Publisher—a registered user who publishes one or more digital resources to others.

Subscriber—any registered user, other than the publisher, who may subscribe or has subscribed one or more digital resources from the publisher.

Non-subscriber user—a user who has not yet been registered with the Web service. A non-subscriber user may send a request to a registered user/publisher for subscription of a shared resource and may establish a limited sharing relationship with the publisher.

Resource—Anything which can be shared by users through Internet access.

Views—Different versions of a resource. Information contained in different views is at least partially different.

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

The invention claimed is:

1. A system for sharing digital resources of a publisher through a web service, the system comprising:
one or more processors; and
one or more memories operatively coupled to at least one of the one or more processors and having instructions stored thereon that, when executed by at least one of the one or more processors, cause at least one of the one or more processors to:
receive a selection from a publishing user of a digital resource to share, wherein the digital resource is associated with a plurality of views;
receive a selection from the publishing user of a group of subscribing users, the selection indicating that the digital resource is to be shared with the group of subscribing users according to one of the plurality of views;
receive a selection of a sharing relationship from the publishing user, the sharing relationship specifying allowable interactions with the selected digital resource by the group of subscribing users; and
in accordance with the selection of the sharing relationship, control interactions of the selected group of subscribing users with the one of the plurality of views of the selected digital resource, including at least:
in accordance with a determination that the selected sharing relationship includes a first sharing relationship, sending a copy of the one of the plurality of views of the digital resource to the selected group of subscribing users, wherein the one of the plurality views has metadata describing a sharing style that corresponds to the selected sharing relationship for the selected group of subscribing users; and
in response to receiving from the publishing user a change notification concerning modification to the selected digital resource: forwarding the change notification to the selected group of subscribing users, receiving from a subset of the selected group of subscribing users a request to block future notifications from the publishing user, and modifying the sharing relationship to enable blocking of future notifications from the publishing user.

2. The system of claim 1, wherein the one of the plurality views has metadata describing a respective version.

3. The system of claim 1, wherein the one of the plurality views has metadata describing a respective creation date.

4. The system of claim 1, wherein the one of the plurality views has metadata describing a respective size.

5. The system of claim 1, wherein:
a user that requests the digital resource can edit information in a local copy of the digital resource, and
the edited information in the local copy of the digital resource is overwritten if the publishing user updates the digital resource.

6. The system of claim 1, including instructions that, when executed by at least one of the one or more processors, cause at least one of the one or more processors to store the sharing relationship selected by the publishing user.

7. The system of claim 1, wherein controlling the interactions of the selected group of subscribing users with the one of the plurality of views of the selected digital resource further includes:
in accordance with a determination that the selected sharing relationship includes a second sharing relationship, allowing the selected group of subscribing users to read the one of the plurality of views of the digital resource in a central repository; and
in accordance with a determination that the selected sharing relationship includes a third sharing relationship, allowing the selected group of subscribing users to write and update the one of the plurality of views of the digital resource.

8. A method for sharing digital resources of a publisher through a web service, the method comprising:
at a system comprising one or more processors and one or more memories coupled to at least one of the one or more processors:
receiving a selection from a publishing user of a digital resource to share, wherein the digital resource is associated with a plurality of views;
receiving a selection from the publishing user of a group of subscribing users, the selection indicating that the digital resource is to be shared with the group of subscribing users according to one of the plurality of views;
receiving a selection of a sharing relationship from the publishing user, the sharing relationship specifying allowable interactions with the selected digital resource by the group of subscribing users; and
in accordance with the selection of the sharing relationship, controlling interactions of the selected group of subscribing users with the one of the plurality of views of the selected digital resource, including at least:
in accordance with a determination that the selected sharing relationship includes a first sharing relationship, sending a copy of the one of the plurality of views of the digital resource to the selected group of subscribing users, wherein the one of the plurality views has metadata describing a sharing style that corresponds to the selected sharing relationship for the selected group of subscribing users; and
in response to receiving from the publishing user a change notification concerning modification to the selected digital resource: forwarding the change notification to the selected group of subscribing users, receiving from a subset of the selected group of subscribing users a request to block future notifications from the publishing user, and modifying the sharing relationship to enable blocking of future notifications from the publishing user.

9. The method of claim 8, wherein the one of the plurality views has metadata describing a respective version.

10. The method of claim 8, wherein the one of the plurality views has metadata describing a respective creation date.

11. The method of claim 8, wherein the one of the plurality views has metadata describing a respective size.

12. The method of claim 8, wherein:
a user that requests the digital resource can edit information in a local copy of the digital resource, and
the edited information in the local copy of the digital resource is overwritten if the publishing user updates the digital resource.

13. The method of claim 8, including storing the sharing relationship selected by the publishing user.

14. A non-transitory computer readable storage medium storing one or more programs configured for execution by one or more processors of a system for sharing digital resources of a publisher through a web service, the one or more programs comprising instructions to be executed by the one or more processors so as to:
receive a selection from a publishing user of a digital resource to share, wherein the digital resource is associated with a plurality of views;
receive a selection from the publishing user of a group of subscribing users, the selection indicating that the digital resource is to be shared with the group of subscribing users according to one of the plurality of views;
receive a selection of a sharing relationship from the publishing user, the sharing relationship specifying allowable interactions with the selected digital resource by the group of subscribing users; and
in accordance with the selection of the sharing relationship, control interactions of the selected group of subscribing users with the one of the plurality of views of the selected digital resource, including at least:
in accordance with a determination that the selected sharing relationship includes a first sharing relationship, sending a copy of the one of the plurality of views of the digital resource to the selected group of subscribing users, wherein the one of the plurality views has metadata describing a sharing style that corresponds to the selected sharing relationship for the selected group of subscribing users; and
in response to receiving from the publishing user a change notification concerning modification to the selected digital resource: forwarding the change notification to the selected group of subscribing users, receiving from a subset of the selected group of subscribing users a request to block future notifications from the publishing user, and modifying the sharing relationship to enable blocking of future notifications from the publishing user.

15. The computer readable storage medium of claim 14, wherein the one of the plurality views has metadata describing a respective version.

16. The computer readable storage medium of claim 14, wherein the one of the plurality views has metadata describing a respective creation date.

17. The computer readable storage medium of claim 14, wherein the one of the plurality views has metadata describing a respective size.

18. The computer readable storage medium of claim 14, wherein:
a user that requests the digital resource can edit information in a local copy of the digital resource, and
the edited information in the local copy of the digital resource is overwritten if the publishing user updates the digital resource.

19. The computer readable storage medium of claim 14, including stored instructions to be executed by the one or more processors so as to store the sharing relationship selected by the publishing user.

* * * * *